United States Patent
Kondo et al.

(10) Patent No.: US 6,674,902 B1
(45) Date of Patent: Jan. 6, 2004

(54) IMAGE PROCESSING APPARATUS IMAGE PROCESSING METHOD, AND STORAGE MEDIUM

(75) Inventors: Toshiaki Kondo, Fujisawa (JP); Masakazu Matsugu, Chiba (JP); Fumiaki Takahashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/363,655

(22) Filed: Jul. 30, 1999

(30) Foreign Application Priority Data

Jul. 31, 1998 (JP) .......................... 10-218122
Jul. 31, 1998 (JP) .......................... 10-218123

(51) Int. Cl.$^7$ .................................. G06K 9/48
(52) U.S. Cl. ................... 382/199; 382/103; 382/190; 382/316
(58) Field of Search ................ 382/103, 151, 382/165, 170, 173, 181, 190, 195, 197, 199, 203–204, 209, 241–242, 284, 291, 316; 348/26, 169; 702/167

(56) References Cited

U.S. PATENT DOCUMENTS

| | | | | |
|---|---|---|---|---|
| 5,119,439 | * | 6/1992 | Osawa et al. | 382/199 |
| 5,379,350 | * | 1/1995 | Shimazu et al. | 382/197 |
| 5,617,487 | * | 4/1997 | Yoneyama et al. | 382/199 |
| 5,703,958 | * | 12/1997 | Hara | 382/124 |
| 5,731,849 | | 3/1998 | Kondo et al. | 348/699 |
| 5,798,769 | * | 8/1998 | Chiu et al. | 345/442 |
| 5,861,886 | * | 1/1999 | Moran et al. | 345/863 |
| 5,987,173 | * | 11/1999 | Kohno et al. | 382/199 |
| 6,046,745 | * | 4/2000 | Moriya et al. | 345/420 |

FOREIGN PATENT DOCUMENTS

| | | |
|---|---|---|
| EP | 825558 | 2/1998 |
| GB | 2 121 534 | 12/1983 |
| JP | 6-251149 | 8/1994 |
| JP | 7-93561 | 4/1995 |
| JP | 7-225847 | 8/1995 |

OTHER PUBLICATIONS

Pauwels, et al. "Autonomous Grouping of Contour–Segments Using an Adaptive Region–Growing Algorithm", IEEE, pp. 586–59 1996.*

Gunn, et al. "A Dual Active Contour for Head Boundary Extraction", IEEE, pp. 1–6, 1994.*

"Segmentation by Texture Using a Co–Occurrence Matrix and a Split–and–Merge Algorithm", Patrick Chen, et al., Computer Graphics and Image Processing, vol. 10, pp. 172–182, 1979.

"Snakes: Active Contour Models", M. Kass, et al., International Journal of Computer Vision, pp. 321–331 (1988).

* cited by examiner

Primary Examiner—Daniel G. Mariam
(74) Attorney, Agent, or Firm—Fitzpatrick, Cella, Harper & Scinto

(57) ABSTRACT

The objective of the present invention is to provide a simple and accurate process for extracting an object from an image, which is used to impose a great load for an operator. According to the present invention, an image processing apparatus comprises an object extracting unit, for performing a predetermined process for image data for a position or an area that is designated and for extracting a specific object from an image, an outline part deciding unit, for selecting and authenticating an arbitrary segment of an outline obtained by the extracting unit, and an outline synthesis unit, for linking and synthesizing together the outline segments that are authenticated. Since a closed curve is formed by synthesizing the outline segments obtained by repeating the above process, and the outline of the object is thus determined, the outline segment that is extracted from the image and matches the correct outline of the object is sequentially selected and authenticated. The thus authenticated outline segments are linked and synthesized to gradually form the overall outline of the object.

11 Claims, 20 Drawing Sheets

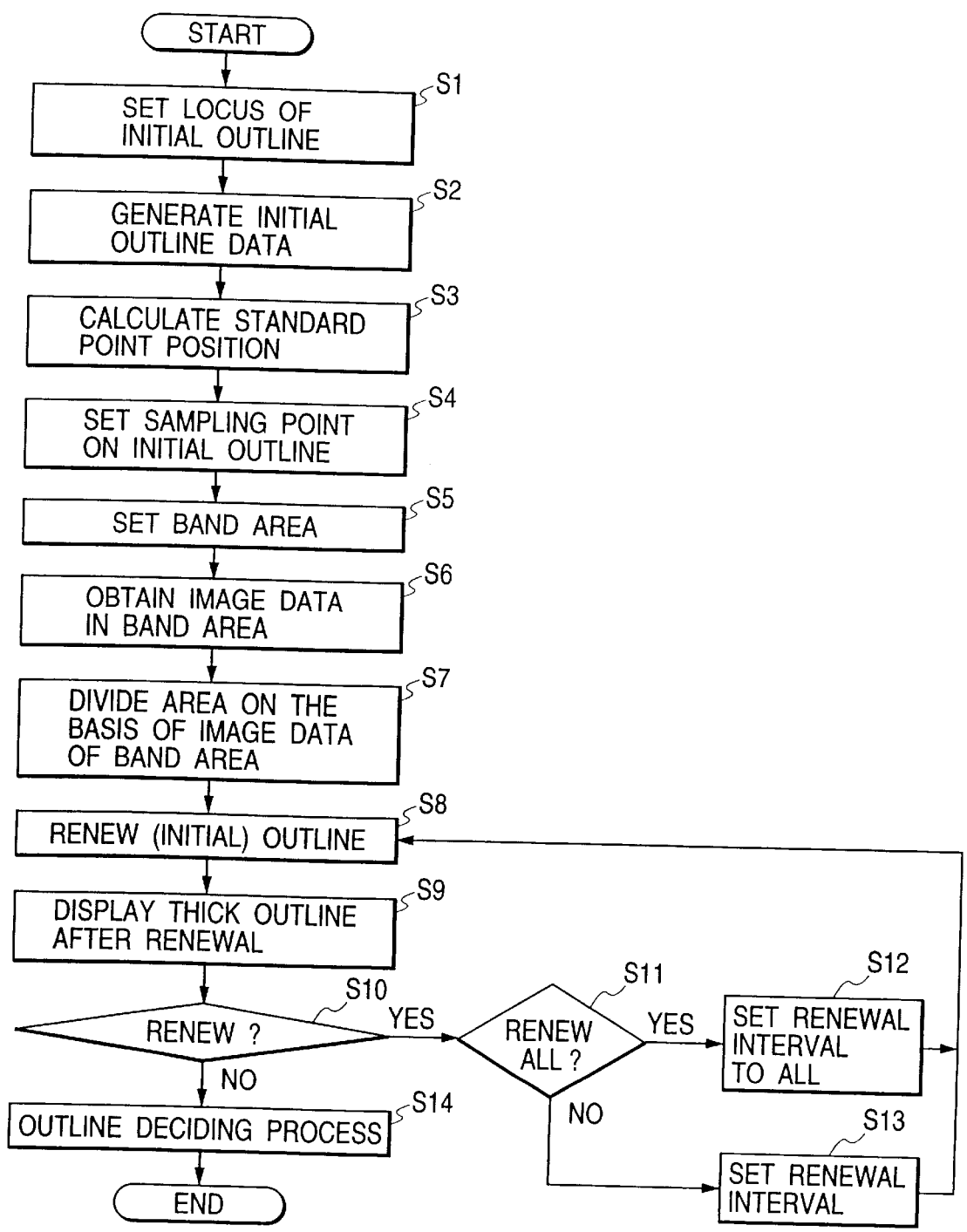

IMAGE PROCESSING APPARATUS IMAGE PROCESSING METHOD, AND STORAGE MEDIUM

BACKGROUND OF THE INVENTION

1. Field of the Invention

The present invention relates to an image processing apparatus, an image processing method and a storage medium.

2. Related Background Art

Roughly three different technique types are employed to extract a specific object from an image:

1. the object extraction type, for sequentially selecting areas having the same density or the same color using an area division method that employs the color tones of an image, the texture (pattern) and color information, and for extracting an object from each area.
2. the outline tracing type, whereby an operator sequentially traces the outline of an object and extracts the object along a tracing locus, whereby an edge is detected in the vicinity of the tracing locus and an object is extracted along the edge, or whereby an operator enters dots at necessary points along the outline of an object and extracts the object by connecting the points with straight lines or by detecting the edge.
3. the enclosure line type, for using a line to enclose an object and to authenticate a parameter for defining the enclosure line, and for repeatedly making trial adjustments to adjust the parameter until the enclosure line adheres to the object.

In type 1 (the area base type) in the prior art, an area that has the same density, the same texture or the same color as the designated area is selected, regardless of the outline of an object. Thus, although one part of the selected area may match the outline of an object to be extracted, there tends to be a remaining part that is not matched. In this case, the results of the process can not be employed.

When, for example, to delete the background of an object an arbitrary point (or a small area) is designated in the background, an area is formed that is regarded as having the same density or the same color as the designated point or the small area. If, however, the area having the same density or the same color is extended and enters the object, the results of the process can not be employed. In this case, the permissible range for an area having the same density and the same color must be set again, or the position of the point or the small area that is designated must be changed and the area re-selected.

The optimal setup for the permissible range for determining an area having the same density or the same color requires an experienced operator and the performance of repeated trials, which places a great load on the operator. In addition, in many cases the outline of an object does not completely match the boundary of the selected area according to which the permissible range is set. Therefore, the employment of a permissible range is limited to images having a flat background, or to an object having the same density or a single color.

In type 2 (the tracing type) in the prior art, generally, a pointing device, such as a mouse, is employed to trace the outline of an object, or dots are formed at necessary points to establish the outline. When the forming of dots is employed, for example, two sequential dots are regarded as a pair, and once this extraction process has been initiated, it must be continued, regardless of whether the object can be extracted, because the apparatus will not acknowledge the extraction process has been completed until the procedure has returned to the point that was first designated.

Similarly, to trace the outline of the object using a tool having a specific width (e.g., a large pen or a brush), an operator, while completing the extraction of the object, must be very careful to fit the outline of the object inside the area described by the width of the tool. This, too, places a great load on the operator.

In type 3 (the enclosure line type) in the prior art, as in type 1, an operator must persistently and repeatedly employ trials to set a parameter and produce an enclosure line, until the enclosure line fully corresponds to the outline of the object. Since depending on the part of an object the correct parameter will differ, even if one part of the enclosure line matches the outline of the object, an overall match can not be acquired, and a desired outline can not be extracted. In addition, this method is hard to apply for an image that includes a complicated background.

SUMMARY OF THE INVENTION

To resolve the above shortcomings, it is a first objective of the present invention to easily and correctly extract a specific object from an image.

It is a second objective of the present invention to permit the partial authentication of an outline so as to provide a simple and accurate process for extracting an object from an image, which used to impose a great load for an operator.

It is a third objective of the present invention to permit an operator to freely change an outline extraction in accordance with local image characteristics so as to improve the accuracy with which an object is extracted from an image.

To achieve the above objectives, according to the present invention, an image processing apparatus comprises:

an input unit for entering information for a designated position on an image;

an extraction unit for extracting the boundary of the image in accordance with the information that is entered and the characteristics of the image;

a decision unit for deciding to obtain one part of an outline using the extraction unit; and a processing unit for linking a plurality of outlines obtained through a plurality of decisions made by the decision unit, and for determining the limits of a closed area.

It is a fourth objective of the present invention to provide an innovative function for extracting an image area.

The other features of the present invention will become obvious during the following explanation of the embodiments and the drawings.

BRIEF DESCRIPTION OF THE DRAWINGS

FIG. 12 is a flowchart showing the fundamental processing performed according to the fourth embodiment;

DETAILED DESCRIPTION OF THE PREFERRED EMBODIMENTS (First Embodiment)

Figure 1:
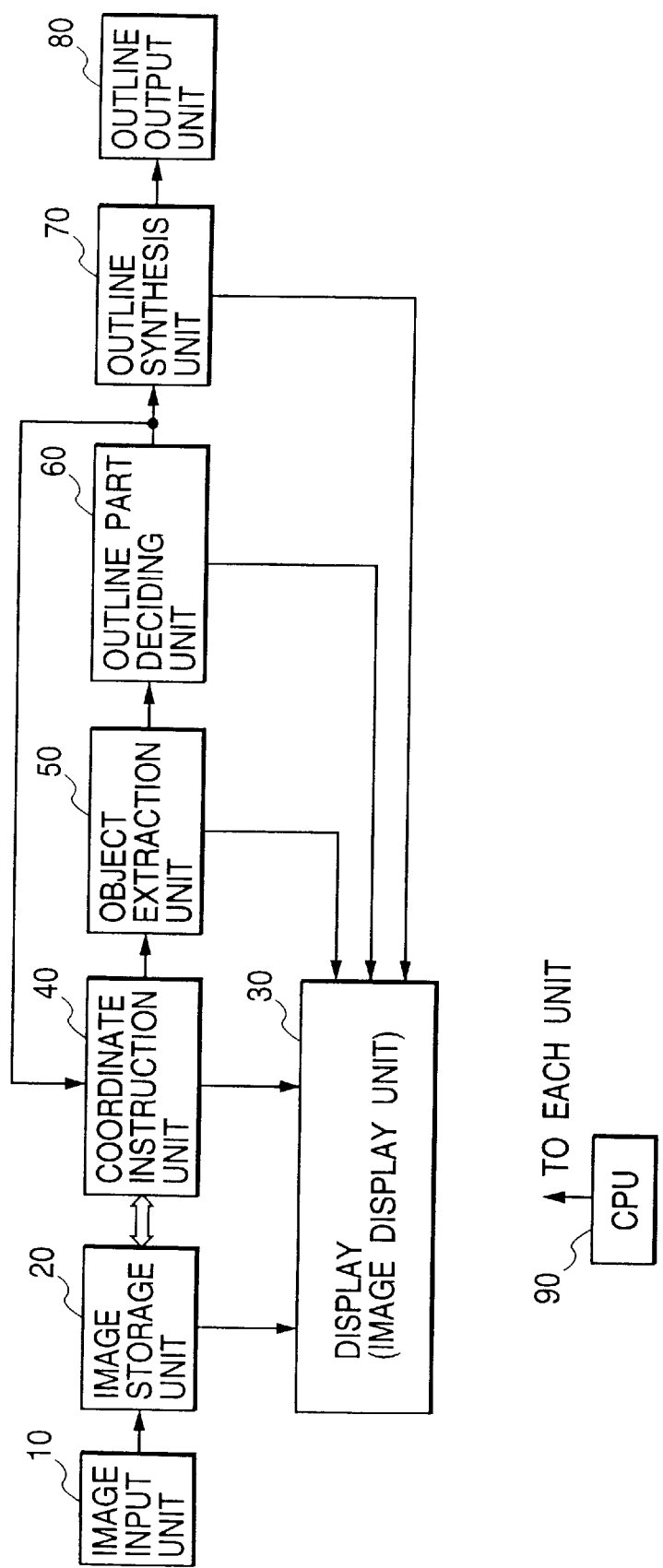
FIG. 1 is a diagram illustrating the functional arrangement.

FIG. 1 is a functional diagram that presents a representation of most of the characteristics of a first embodiment. The arrangement shown at the bottom is implemented by a personal computer or a workstation. In FIG. 1, an image input unit 10 is an input unit, such as a scanner, a digital camera or a digital VTR (VCR), that has a pickup function, or an input unit for reading recorded image data from a storage medium, such as a CD-ROM, an MO, a compact flash memory or a hard disk, and supplying the image data to the image input unit 10. An image storage unit 20 is used to store an input image. An image display unit 30 is a CRT or a liquid crystal display for displaying an input image. A coordinate instruction unit 40 is a mouse or a keyboard for designating arbitrary coordinates or an arbitrary area in an image that is displayed. And an object extraction unit 50 extracts a specific object from an image.

An outline part deciding unit 60 selects a part of an outline of an object that has been extracted by the object extraction unit 50 and decides whether it is a valid representation. An outline synthesis unit 70 links the parts of the outline that the outline part deciding unit 60 has decided are valid representations. When a closed curve is completed by the outline synthesis unit 70, an outline output unit 80 outputs the closed curve as the outline of the object. The individual units 10 to 80 in FIG. 1 are controlled by a CPU 90 in accordance with control code provided by a program (not shown).

Figure 2:
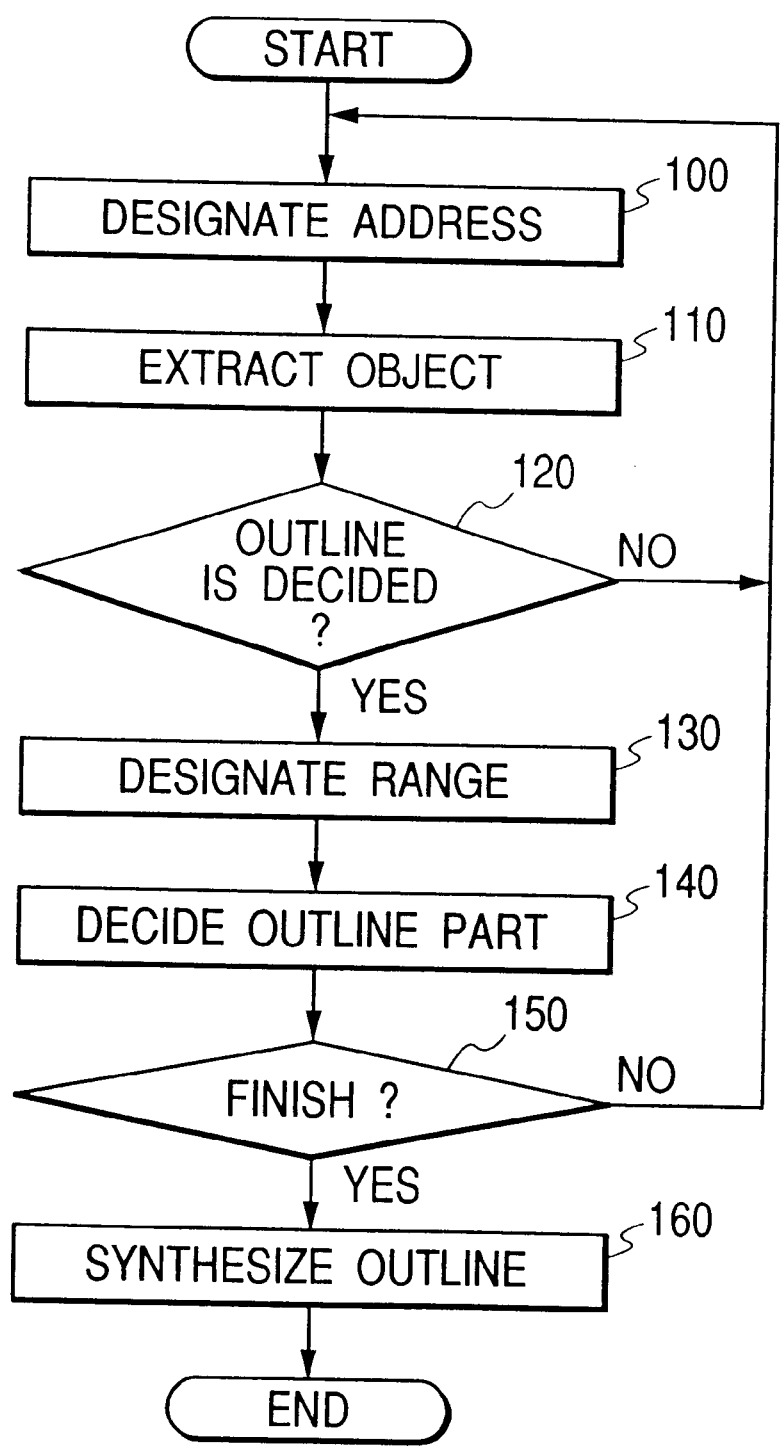
FIG. 2 is a flowchart showing the processing performed according to a first embodiment.

FIG. 2 is a flowchart showing the processing that represents most features of the first embodiment. In FIG. 2, step 100 is a process for using the coordinate instruction unit 40 to designate arbitrary coordinates or an arbitrary area in an input image that is displayed on the image display unit 30; step 110 is a process for extracting an object; step 120 is a process for deciding whether an outline should be authenticated; step 130 is a process for designating the range for an outline to be authenticated; step 140 is a process for authenticating, as an outline, a line segment within the designated range and for storing it; step 150 is a process for deciding whether the extraction process should be terminated; and step 160 is a process for synthesizing a set of outline segments that have been authenticated.

The operation for the first embodiment of the present invention will be described in detail while referring to FIGS. 1 and 2. In FIG. 1, an image is entered by the image input unit 10, such as a scanner, a digital pickup unit or an image data transmission unit connected to an image database, and is stored in the image storage unit 20. At the same time, the input image is displayed on the image display unit 30. The processing is then halted to wait for an operator to use the coordinate instruction unit 40 to enter an instruction.

While looking at the displayed image, the operator employs the coordinate instruction unit 40 to perform manipulations in consonance with a request received from the object extraction unit 50, e.g., to designate a point or a small area in a background, to trace an outline, to form dots or to enclose an image (step 100 in FIG. 2). The results of the manipulations performed by the operator are superimposed on the input image displayed on the image display unit 30. The object extraction unit 50 then extracts a desired object based on image information that was designated by using the coordinate instruction unit 40 (step 110 in FIG. 2).

Figure 3:
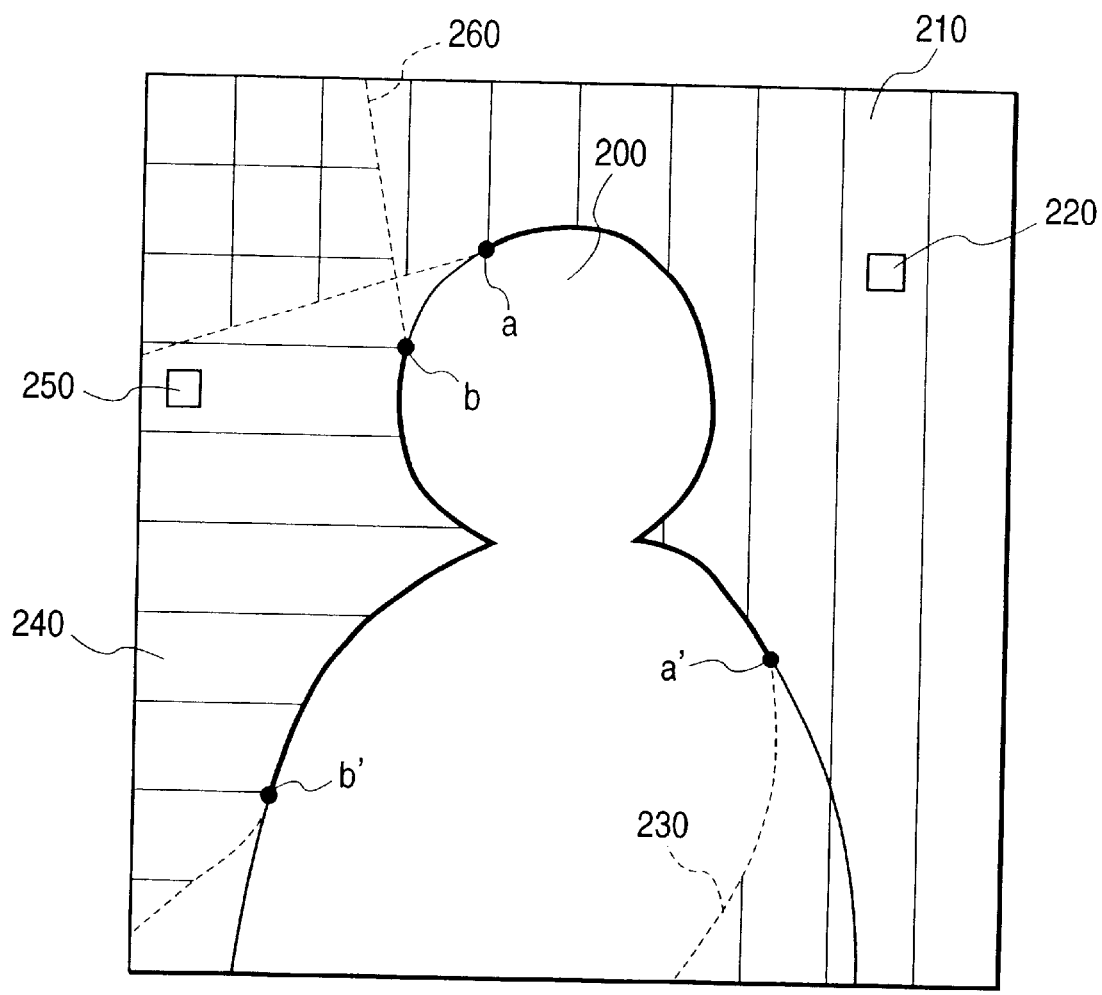
FIG. 3 is a diagram showing the state where an object is extracted using type 1 (the area base type) by applying the first embodiment.

The processing performed by the object extraction unit 50 (step 110 in FIG. 2) will be described more specifically while referring to FIGS. 3 to 5. FIG. 3 is a diagram showing an example display on the image display unit 30. A parameter is obtained based on one of the image information types related to the density, color and texture of an image, or is obtained by weighting and adding together two or all of the above image information types and making a decision based on the resultant density, color and texture of the image. Based on the thus acquired parameter, to extract an object an area evincing the same quality is selected (type 1).

In FIG. 3, an object 200 is the one that is to be extracted, and a vertically striped area 210 is an area evincing the same quality as does a pixel or a small area 220 designated by the coordinate instruction unit 40. The object extraction unit (step 110 in FIG. 2) employs the image data for the designated small area 220 to extract the area 210 evincing the same quality. Although a detailed description will be given later while referring to the flowchart in FIG. 2, one interval (a–a') along a boundary 230 (chained line) of the extracted area 210 matches the outline of the object 200, and can be selected and authenticated by the outline part deciding unit 60.

Similarly, a horizontally striped area 240 is an area that is regarded as evincing the same quality as another small area 250 that is designated by the coordinate instruction unit 40. The object extraction unit 50 (step 110 in FIG. 2) employs the image data for the designated small area 250 to extract the area 240 evincing the same quality. The interval (b–b')

along a boundary 260 (broken line) of the extracted area 240 matches the outline of the object 200, and can be selected and authenticated by the outline part deciding unit 60.

As is described above, the outline of an object is gradually formed by repeatedly designating small image areas, extracting areas evincing the same qualities, and making decisions concerning outline segments. In this embodiment, since the correct outline segments are selected and authenticated, the superimposing of the selected areas (210 and 240) (upper left in FIG. 3) or the entry into the object of a part of a selected area does not affect the extraction of the object.

Figure 4:
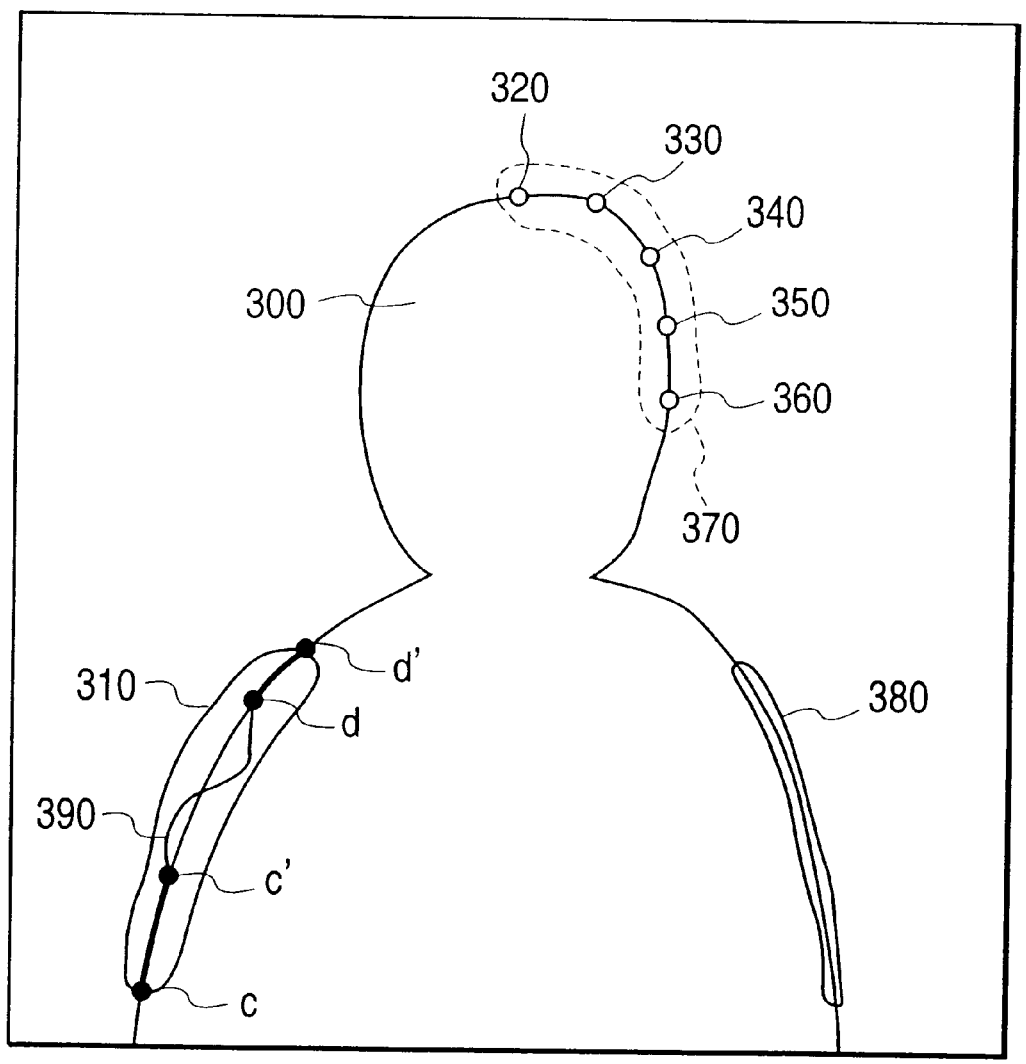
FIG. 4 is a diagram showing the state where an object is extracted using type 2 (the trace type) by applying the first embodiment.

FIG. 4 is a diagram showing the state where an object is extracted as an operator traces the outline of the object on the image display unit 30 (type 2). In FIG. 4, an object 300 is the one to be extracted, and a band area 310 is an area obtained when the operator traces the outline of the object 300 using a tool (the coordinate instruction unit 50) having a specific width. The object extraction unit 50 extracts the edge elements of the image in the band area 310, and determines the configuration of the outline of the object 300.

In an outline 390 obtained in the band area 310, interval (c–c') and interval (d–d') are correct segments. These two intervals can be selected and authenticated by the outline part deciding unit 60. As for the interval (c'–d) that does not match the outline of the object 300, the parameter that is used for detecting the edge elements and for tracing the edges may be reset to reselect the interval, or the intervals may be smoothly linked together either manually or by using the curvature information for the intervals (c–c') and (d–d').

Points 320, 330, 340, 350 and 360 are formed along the outline of the object 300 by the operator while using the coordinate instruction unit 40. The object extraction unit 50 links the adjacent points by referring to the edge strength. An area 370 indicated by a broken line defines a range for the detection of an edge, and may be displayed on the image display unit 30 as an indicator for the operator. To extract a complicated object, the dot forming method is easier than the previously described method for drawing the band area 310.

A band area 380 is the same as the band area 310, except that the width of the band is smaller. When many edge elements other than the outline are present in the vicinity of the outline of the object 300, such a method is effective for establishing a small width for the band area that can be changed by the coordinate instruction unit 40, and for limiting the range employed for the edge detection. When enough color information is available, the edge detection process is stably performed while taking the color information into account, but when not enough color information is available, it is performed while taking luminance information into account.

Figure 5:
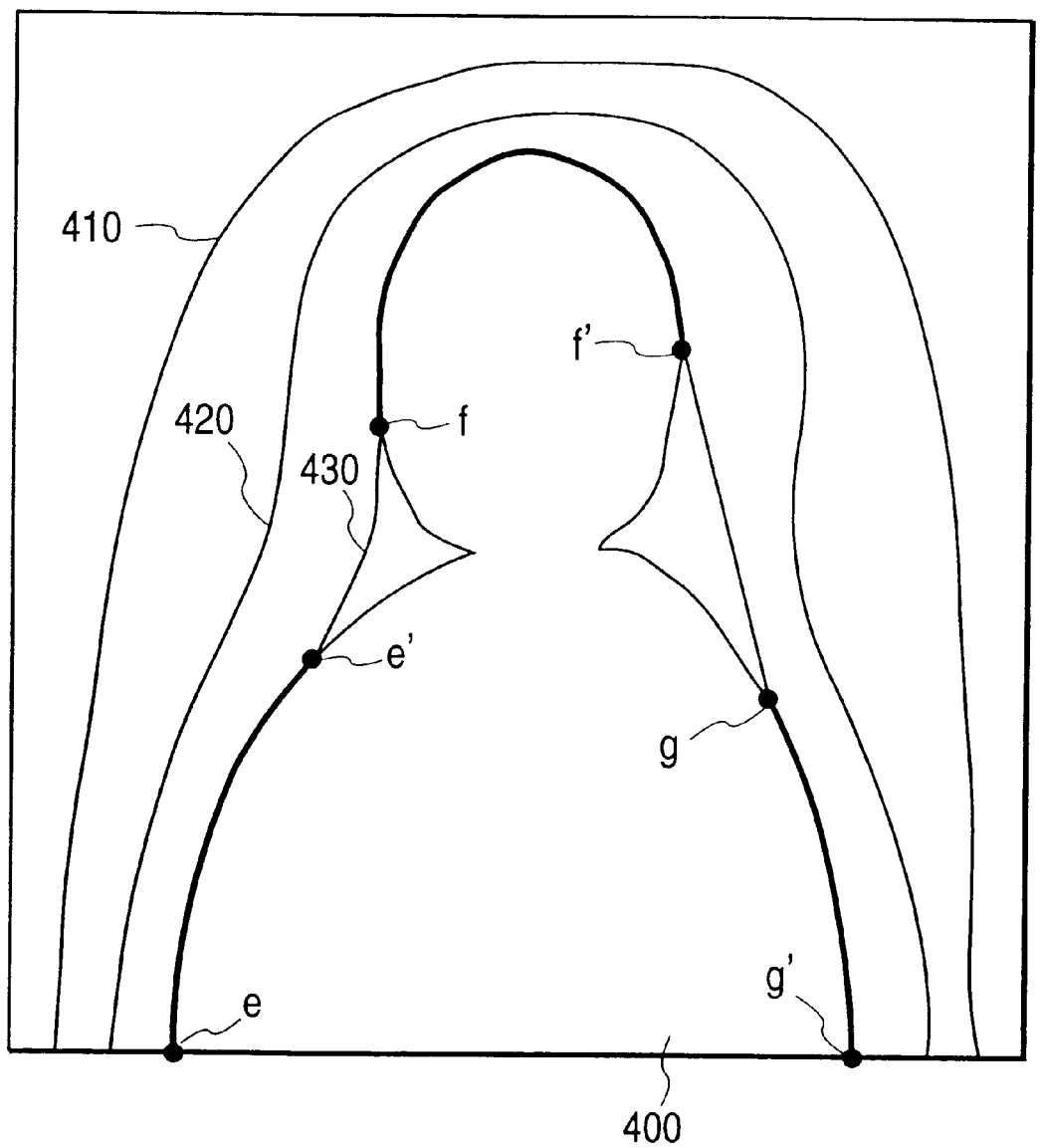
FIG. 5 is a diagram showing the state where an object is extracted using type 3 (the enclosure line type) by applying the first embodiment.

FIG. 5 is a diagram showing the state (type 3) wherein to extract an object an operator first draws a line that encloses the object on the image display unit 30, and the enclosure line is gradually reduced until it corresponds to the edge of the image. In FIG. 5, an object 400 is the one to be extracted; an initial enclosure line 410 is a line entered by an operator using the coordinate instruction unit 40; an enclosure line 420 is a line formed during the reduction process; and an enclosure line 430 is a line formed part of the enclosing has reached the object 400. The object extraction unit 50 reduces the initial enclosure line 410 to the enclosure line 430, part of which has reached the object 400, and extracts the object 400.

Along the part of the enclosure line 430 that has reached the object 400, intervals (e–e'), (f–f') and (g–g') correctly describe the outline of the object 400, and can be selected and their use decided on by the operator using the outline part deciding unit 60. After these three intervals have been authenticated as outline segments, the object extraction unit 50 continues the enclosure line reduction to extract the unauthenticated outline intervals (e'–f) and (f'–g).

As is described above, the correct outline segments are selected and authenticated step by step. Therefore, even if the enclosure line partially enters the object or even if parts of the enclosure line are farther away from the outline than the rest, the extraction of the object is not adversely affected.

In FIG. 5, an enclosure line enclosing the object 400 is employed. However, in the object 400 an internal line can be described, and the internal line can be gradually expanded to extract the outline of the object 400.

The results obtained by the object extraction unit 50 (step 110 in FIG. 2), which have been described in detail while referring to FIGS. 3 to 5, are superimposed on the display on the image display unit 30. While watching the processing results shown on the display, the operator can determine whether the outline of the object has been detected correctly (step 120 in FIG. 2). If a correct outline has been detected, even partially, the correct outline segment is designated by the outline part deciding unit 60 (step 130 in FIG. 2), and is authenticated (step 140 in FIG. 2).

Figure 6A:
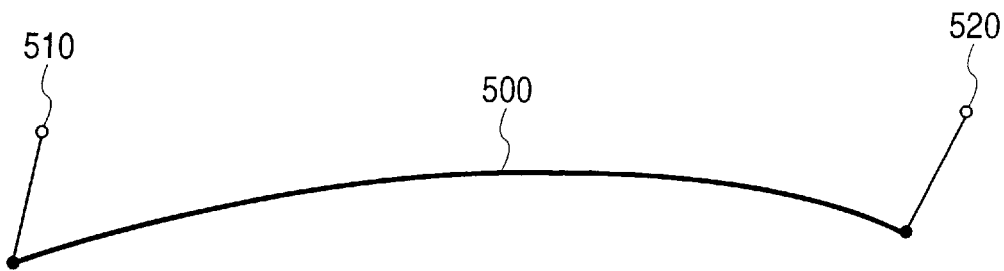
FIGS. 6A, 6B and 6C are diagrams showing the state where an outline part deciding unit makes a decision concerning a part of an outline.

The method used for selecting and authenticating an outline segment will now be described while referring to FIG. 6, which shows the state displayed on the image display unit 30. A line segment 500 in FIG. 6A is an outline segment extracted by the object extraction unit 50, and is a choice for the correct outline of the object. Upon receiving an instruction from the operator using the mouse or the keyboard, pin symbols, pins 510 and 520, are displayed at the ends of the outline segment 500. When the extracted outline segment 500 is overall correct, the operator instructs its authentication (step 140 in FIG. 2). The operation for instructing the authentication is effected by clicking a mouse button or by selecting a decision button on a menu on the display screen.

Figure 6B:
Figure 6C:
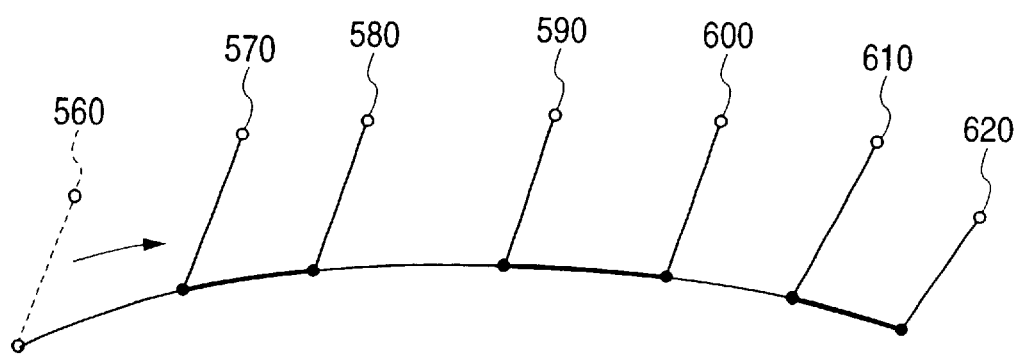

FIGS. 6B and 6C are diagrams showing the process for selecting and authenticating parts of the outline segment. In FIG. 6B, a pin 550 at the right end of the outline segment displayed on the image display unit 30 is shifted to the left and placed in a new position 540. When the operator instructs the authentication of the outline, the line segment sandwiched between pins 530 and 540 is authenticated as an outline. In this example, the position of the pin is changed by moving it; however, the pin may simply be removed.

In FIG. 6C, line segments to be selected are sequentially located on the image display unit 30. A pin 570 is set by shifting a pin 560 from the left end, and pins 580, 590, 600 and 610 are additional pins placed by an operator. When the operator instructs the authentication of the outline, the outline part deciding unit 60 scans the line segments of the outline beginning at the end, and reads and stores only the coordinates of the line segments sandwiched between the individual pins.

Specifically, since to define a selected area pins are always paired, the line segment is scanned beginning at the end, the coordinates of the line extending from the first detected pin to the next detected pin are stored, and the coordinates for the line up until the succeeding pin is detected are skipped. That is, scanning is initiated at the end of the line segment, and each time a pin is detected, the reading and the storing of the outline is turned on or off. When a pin that is not paired with another is detected, using the image display unit 30, an alarm for the operator is issued requesting the addition of a new pin or the deletion of the extra pin.

The end points of the outline that is authenticated are not only displayed by symbols, but also the shape, color and brightness of the symbols may be changed as time elapses. Further, if a symbol indicating an end point as a choice for a correct outline differs from a symbol for indicating the end point of a line segment that has been authenticated as an outline, the operator can identify the authenticated portion and can efficiently process an unauthenticated outline.

As is described above, any type of end point identification unit can be employed so long as it can clearly signal to the operator whether or not authentication of the outline has been performed, and can designate the locations of the end points of line segments.

When, at step 150, the operator instructs the termination of the extraction process after the authentication of outline segments (steps 130 and 140 in FIG. 2) has been repeated, program control moves to the final step 160 (processing by the outline synthesis unit 70). The outline synthesis unit 70 then links the authenticated outline segments to generate a single closed curve.

The process performed by the outline synthesis unit 70 differs depending on the storage form employed for the authenticated outline segments. For example, when the outline segments are to be stored as a set of vector data represented by the start coordinates and the end coordinates, the synthesis rule is determined in advance to cope with the overlapping or intersecting of line segments or the forming of a local closed curve, and one closed curve is gradually formed in accordance with the rule. When the outline segments are to be stored as binary images, the authenticated outlines are overwritten (logical sum) each time in a two-dimensional image storage unit for the outline data.

If the process at step 140 is terminated before a closed curve is completely formed, discontinuous points are present in the synthesized outline. In this case, the outline synthesis unit 70 connects the nearest discontinuous points. These points may be linked together linearly, or may be linked smoothly by referring to the curvature on the periphery of the discontinuous points.

When one closed curve has been formed as a result of the synthesis, the coordinate values for one round of the closed curve are output by the outline output unit 80.

As is described above in detail, according to the present invention, extraction of an object is repeated by using one of the above types, and portions that match the correct outline of the object are authenticated gradually. Therefore, in the extraction process using type 1 (area base type), the permissible range for regarding an area as having the same density and the same color need not be increased, and the position of a point or of a small image area that is designated need not be set many times through trial and error, so that the extraction process does not have to be performed again. Further, at the last a complete match of the outline of the object and of the boundary of a selected area is ensured.

Compared with the extraction process using type 2 (trace type), the tracing or the forming of dots does not have to be continued until the procedure had returned to the first designated point, and the load imposed on the operator can be reduced.

Compared with the extraction process using type 3 (enclosure line type), the setup of a parameter does not have to be repeatedly performed until the enclosure line is reduced or expanded to match the outline of the object, and the correct outline of the object can be extracted, even for an image that includes a complicated background.

(Second Embodiment)

Figure 7:
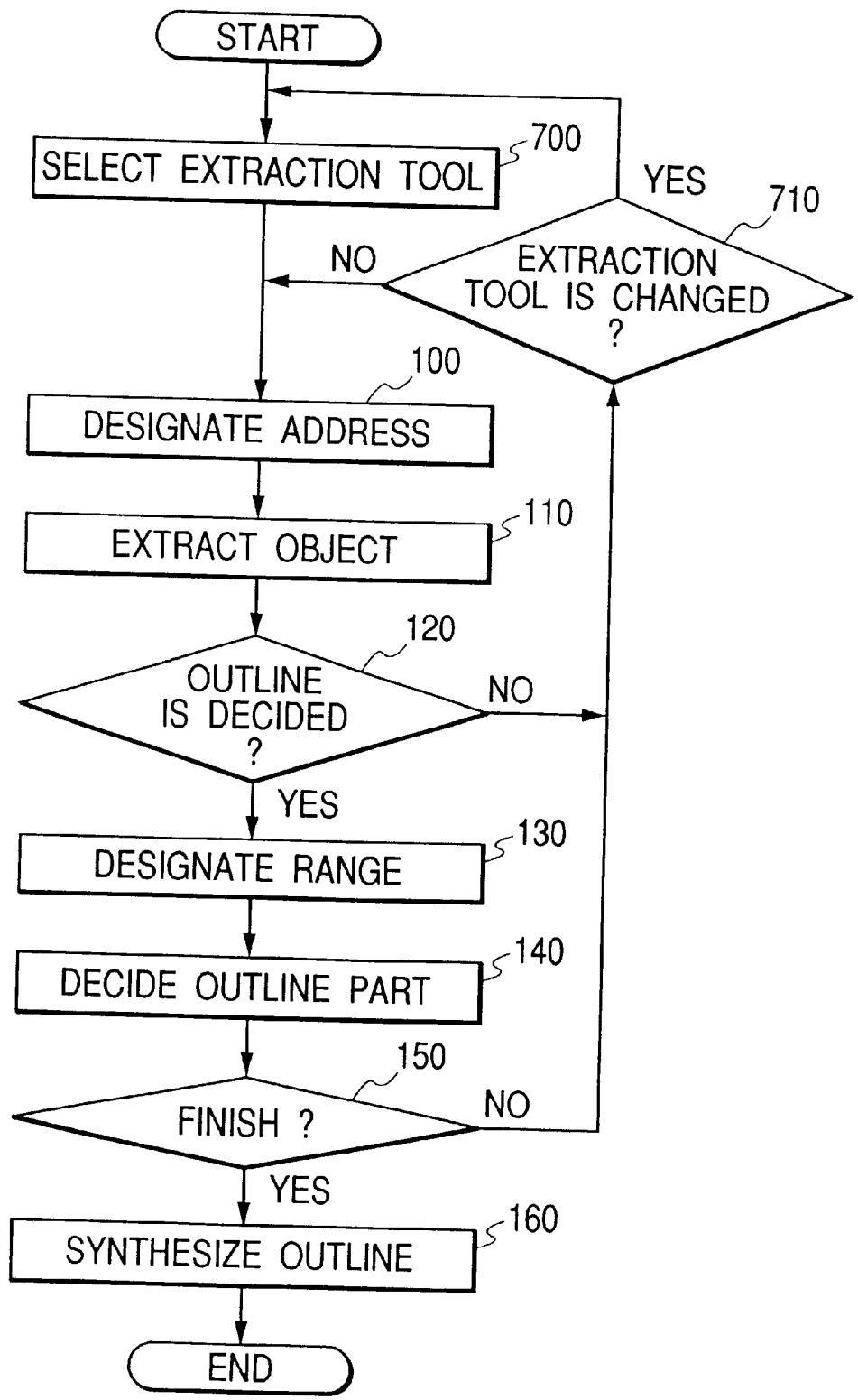
FIG. 7 is a flowchart showing the processing performed according to a second embodiment.

FIG. 7 is a flowchart showing the processing for a second embodiment of the present invention. The primary difference from the first embodiment in FIG. 2 is the addition of steps 700 and 710. At step 700, an object extraction unit is selected, and at step 710, a check is performed to determine whether the currently used object extraction unit should be changed or should continue to be employed.

An explanation will now be given, while referring to FIG. 8, for the processing performed to switch between the use of the above three types as the object extraction method.

Figure 8:
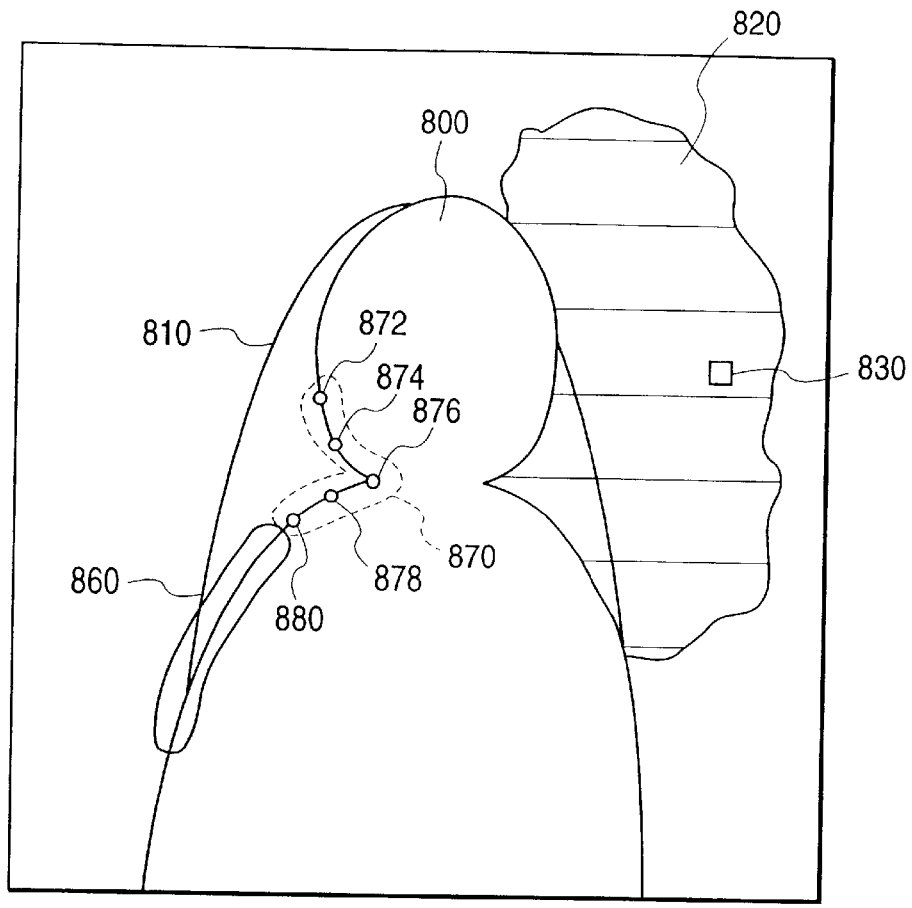
FIG. 8 is a diagram showing the state where object extraction units are switched to extract an object by applying the second embodiment.

FIG. 8 is a diagram showing the state wherein the operator extracts an object while switching between the three types of object extraction methods shown in FIGS. 3 to 5.

In FIG. 8, an object 800 is the one to be extracted; an enclosure line 810 is a line described to enclose the object 800; a closed area 820 is an area regarded as evincing same quality (e.g., the same color or the same density) as a designated small area 830; a band area 860 is an area designated when the operator traces the outline of the object 800 using a tool having a specific width; and a area 870 is a search area for the extraction of the outline when points 872, 874, 876, 878 an 880 are formed.

In this embodiment, the optimal object extraction method is selected in accordance with the characteristics of an image and the outline segment is extracted. The extracted outline segments are sequentially authenticated by the outline part deciding unit 60, so that the overall outline of the object can be gradually assembled. Type 1 (area base type) or type 3 (enclosure line type) is appropriate for an image portion in a simple pattern, and the object can be extracted quickly and requires on a small amount of labor. Since the outline portion that can not be extracted by type 1 or 3 can be extracted using type 2 (tracing type), an object having any shape can be correctly extracted.

As is described above, since, in accordance with the image type, the operator selects the optimal object extraction method for the individual portions of an image and authenticates and synthesizes the outline segments for the portions, the object can be extracted quickly and correctly.

(Third Embodiment)

According to the first and the second embodiments, the operator, for example, determines when to terminate step 140 for the authentication of the outline segments by the outline part deciding unit 60, and after step 140, the outline segments are collectively synthesized at step 160. In the third embodiment, step 140, for authentication of the outline segments, and step 160, for the synthesis of the outline segments, are directly connected together to automatically determine the end of the outline part of the authentication step.

Figure 9:
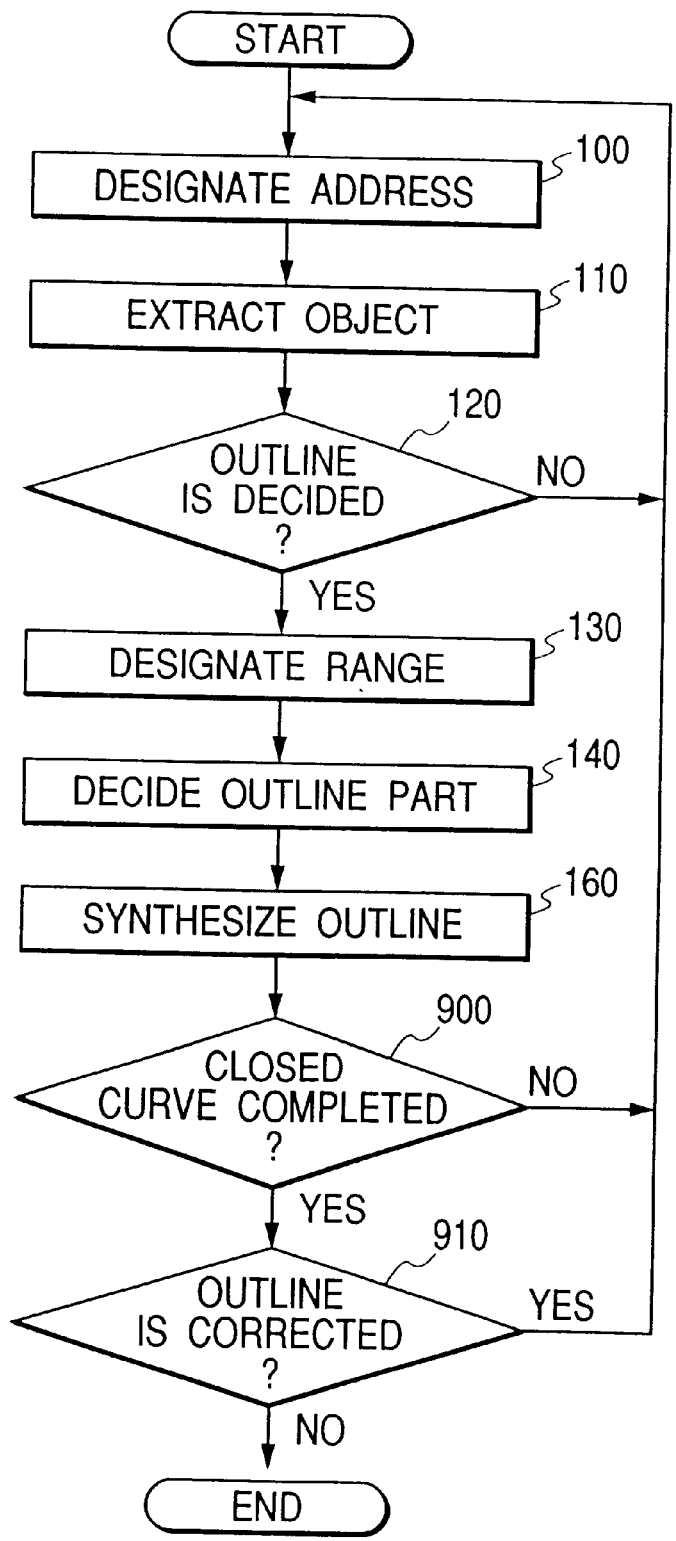
FIG. 9 is a flowchart showing the processing performed according to a third embodiment.

FIG. 9 is a flowchart showing the processing performed for the third embodiment. In FIG. 9, the termination decision step 150 in FIGS. 2 and 7 is deleted, and the use of the outline part authentication step 140 and the outline synthesis step 160 is continued. Further, step 900 for determining whether a closed curve has been completed and step 910 for determining whether an outline should be corrected after the closed curve has been completed are additionally provided.

In FIG. 9, at outline synthesis step 160, each time an outline segment is authenticated at outline part authentication step 140, it is linked with a previously authenticated outline. At step 900, a check is performed to determine whether as a result a closed curve has been formed. This determination can be made by determining whether an end point indicating either end of the authenticated line segment is present, or by tracing the resultant outline, beginning at an arbitrary start point, and by determining whether as a result of the tracing the processing has returned to the starting point. If an end point (a discontinuous point) remains, program control returns to step 100 to select a new line segment.

If it is ascertained at step 900 that a closed curve has been obtained, a notice to that effect is provided for operator by, for example, changing the color or the thickness of the closed curve, or by adding highlighting inside the closed curve or in the outer area. At step 910, as the confirmation screen is displayed on the image display unit 30 for confirmation as to whether the obtained closed curve should be corrected, and an instruction entered by the operator, using the mouse or the keyboard, is waited for. If an instruction to correct the closed curve is entered by the operator, program control returns to step 100 to designate an area to be corrected. If the operator enters an instruction indicating there is no need for a correction, the processing is thereafter terminated.

According to this embodiment, the extraction of an object can be semi-automated until the overall outline of the object is authenticated, and the load imposed on the operator can be further reduced.

As is described above, the image processing apparatus comprises the object extraction unit, for extracting an object from an image through a predetermined process while using image data for a designated position and area; the outline part deciding unit, for selecting and authenticating a specific segment of an outline obtained by the extraction process; and the outline synthesis unit, for linking and synthesizing the outline segments that have been authenticated. Therefore, from among the outline segments extracted from the image, the operator sequentially selects and decides which segments match the correct outline of the object, and by linking and synthesizing a set of the authenticated outline segments, gradually forms the overall outline of the object.

As a result, the operator can extract outline segments at random from arbitrary locations, without being cognizant ware of the overall outline of an object, and can extract a desired outline as a whole. Thus, when the operator does not obtain the correct outline of the object through the first extraction, he or she does not need to perform a troublesome process, such as the resetting of a parameter and the repetition of the processing, or tracing the outline of an object, starting at the beginning. The operator can easily and correctly extract a specific object from an image.

Since at least two outline extraction methods are prepared and can be freely switched, the optimal extraction method can be employed for the individual portions of an outline, and an object can be extracted more correctly.

(Fourth Embodiment)

Figure 10:
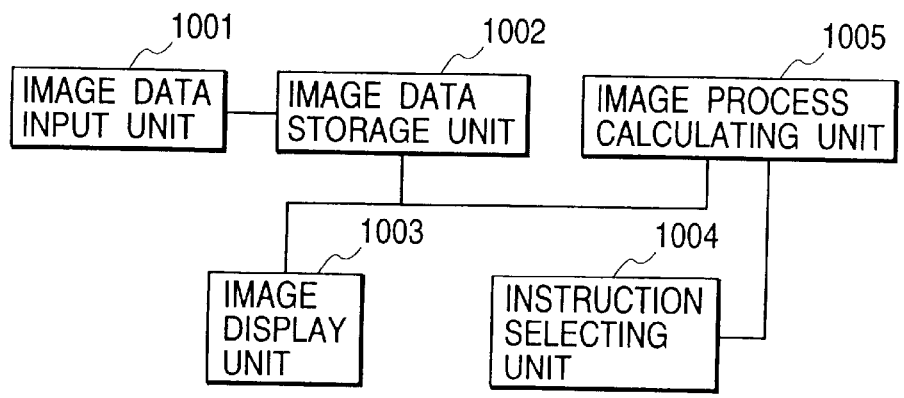
FIG. 10 is a block diagram illustrating the essential arrangement of an image processing apparatus according to a fourth embodiment.

FIG. 10 is a diagram showing the arrangement of the essential portion of an image processing apparatus for extracting an object according to a fourth embodiment. In FIG. 10, the image processing apparatus comprises: an image data input unit 1001, an image data storage unit 1002, an image display unit 1003, an instruction selecting unit (e.g., a mouse) 1004 and an image process calculating unit 1005.

In this embodiment, first, an image including an object to be extracted is entered by the image data input unit 1001. The image is stored in the image data storage unit 1002 and is also displayed on the image display unit 1003. The image data input unit 1001 consists of a scanner, a digital pickup unit (a digital still camera or a digital cam coder), or an image data transmission unit connected to an image database. Upon receiving an instruction entered a user employing the instruction selecting unit 1004, the image process calculating unit 1005 extracts a specific object.

Figure 11:
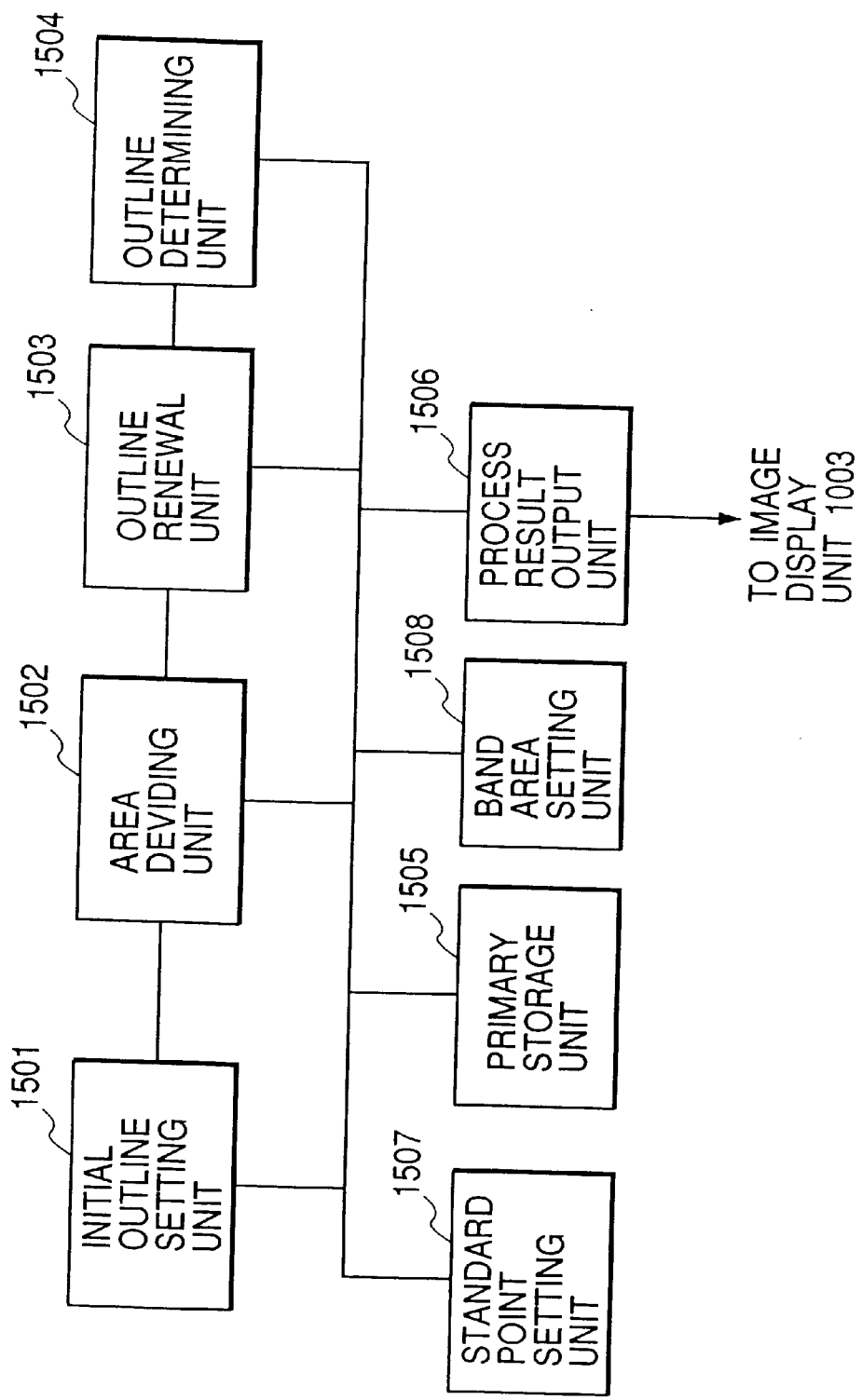
FIG. 11 is a block diagram illustrating the detailed arrangement of an image process calculating unit in FIG. 10.

As is shown in FIG. 11, the image process calculating unit 1005 comprises: an initial outline setting unit 1501, an area deciding unit 1502, an outline renewal unit 1503, an outline determining unit 1504, a primary storage unit 1505, a process result output unit 1506, a standard point setting unit 1507, and a band area setting unit 1508.

The processing performed by the individual units in the image process calculating unit 1005 will now mainly be described while referring to FIGS. 10 and 11, which shows the arrangement of the image processing apparatus of this embodiment, FIG. 12, which shows the flowchart, and FIG. 15, which shows the intermediate results in obtained by the processing.

Figure 15A:
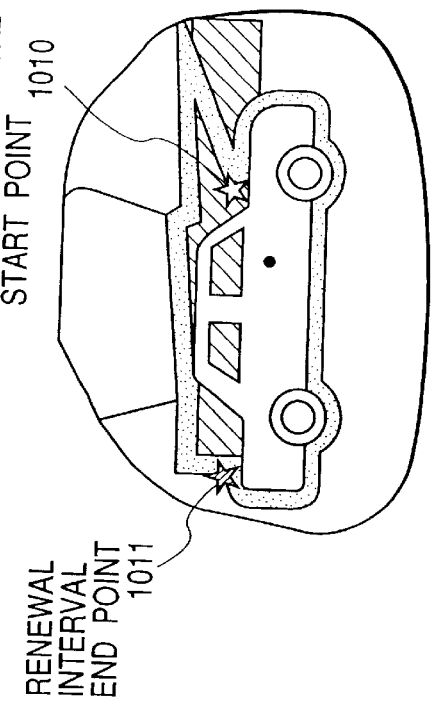
FIGS. 15A, 15B, 15C and 15D are diagrams showing intermediate results obtained during the processing performed by the image processing apparatus according to the fourth embodiment.

In FIG. 12, first, as is shown in FIG. 15A, a user employs the instruction selecting unit 1004 (hereinafter referred to as a mouse) to set the initial closed outline as an arbitrary shape that encloses an object (a car in this case) to be extracted from an image displayed on the image display unit 1003 (step S1). Specifically, the user presses a button on the mouse 1004 to draw the locus of a curve that encloses the object while confirming the location of a cursor (not shown) on the image display unit 30.

Then, the initial outline setting unit 1501 of the image process calculating unit 1005 samples the points along the locus at a predetermined interval, and generates, as an initial outline 1006, a smooth curve that links the sampling points (step S2). The initial outline 1006 may be generated when a user designates arbitrary points outside the object by clicking the mouse 1004 a plurality of times, and the initial outline setting unit 1501 connects the designated points by a straight lines.

The standard point setting unit 1507 calculates the position of the center of gravity of the initial outline 1006 as the position of a standard point 1007 (step S3). The band area setting unit 1508 samples the points along the initial outline 1006 at a predetermined interval, so that the lengths of line segments along the outline are equal (step S4). A rectangular band area 1009 having a predetermined width (e.g., approximately 10 pixels) is extended from the line segment and connects a specific sampling point 1008 and the standard point 1007 in the center (step S5).

In the process at step S4, the polar coordinates for which the position at the center of gravity (the standard point 1007) is the center may be set, and sampling may be performed so that the lengths of the angular element intervals are equalized.

For example, 12 points along the initial outline 1006 may be sampled so as to obtain interval at an angle of 30 degrees in the polar coordinate system. It should be noted that each band area 1009 corresponds to each sampling point 1008, and the areas and the sampling points are equal in number.

Figure 13A:
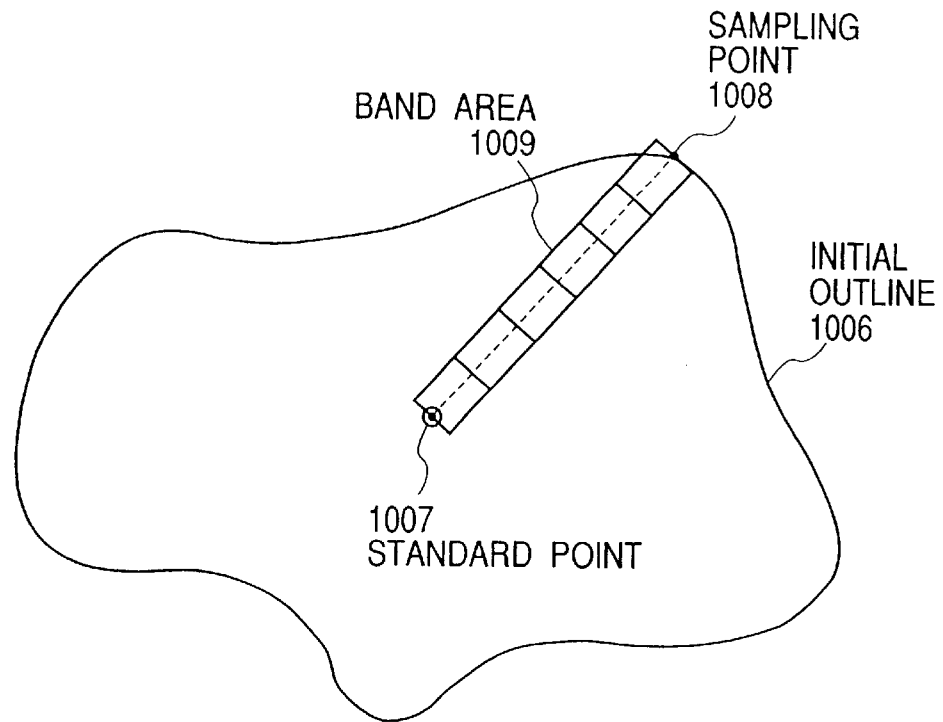
FIGS. 13A and 13B are diagrams showing a band area and the results obtained by its division.

The area division unit 1502 obtains image data from the band area 1009 (step S6), and employs the image data to divide the band area 1009 longitudinally (the direction of the line segment connecting the standard point 1007 and the sampling point 1008) (step S7). FIG. 13A is a diagram showing a boundary obtained as a result of the division of the rectangular band area 1009.

Figure 13B:
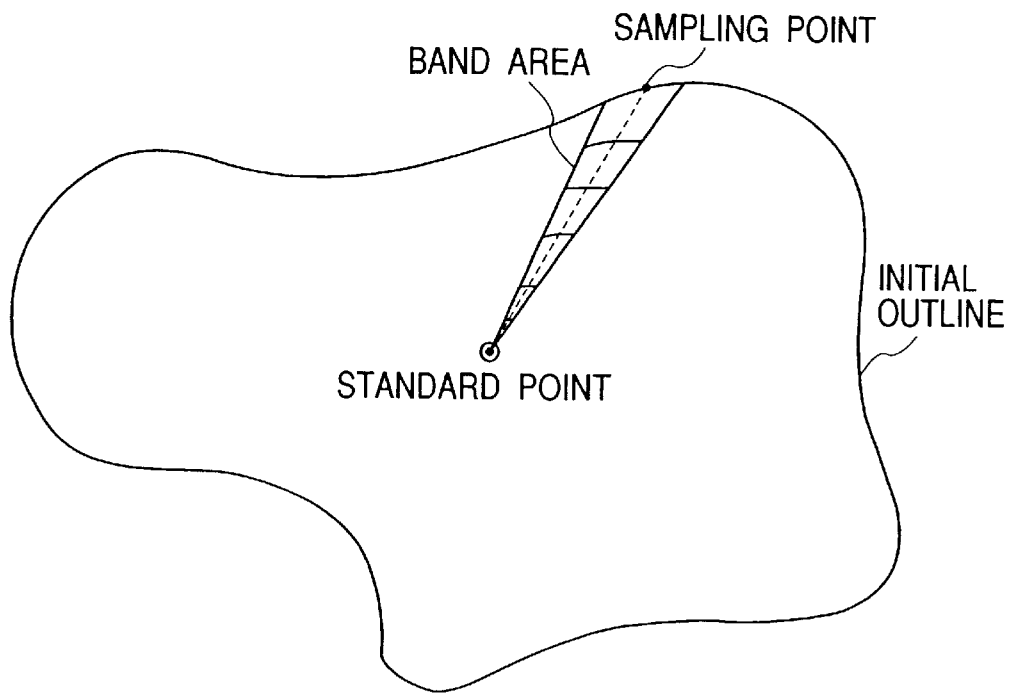

The shape of the band area 1009 may be a fan having a predetermined vertex angle (e.g., approximately 10 degrees). In this case, a boundary (a more than one can be set) is determined that passes through a specific point in the area and mainly has a circumferential element as a directional element. In FIG. 13B, an example for dividing a fan area for image data is shown. A linear line or an arched curve is an representative example boundary of the rectangle or the fan. The shape of the boundary is not limited to this, and only the primary directional element need substantially intersect the longitudinal direction of the area. And the shape of the boundary need only be set in accordance with image data. The band area 1009 does not necessarily involve the standard point 1007, and the standard point may be set in the vicinity of the sampling point 1008.

Figure 14:
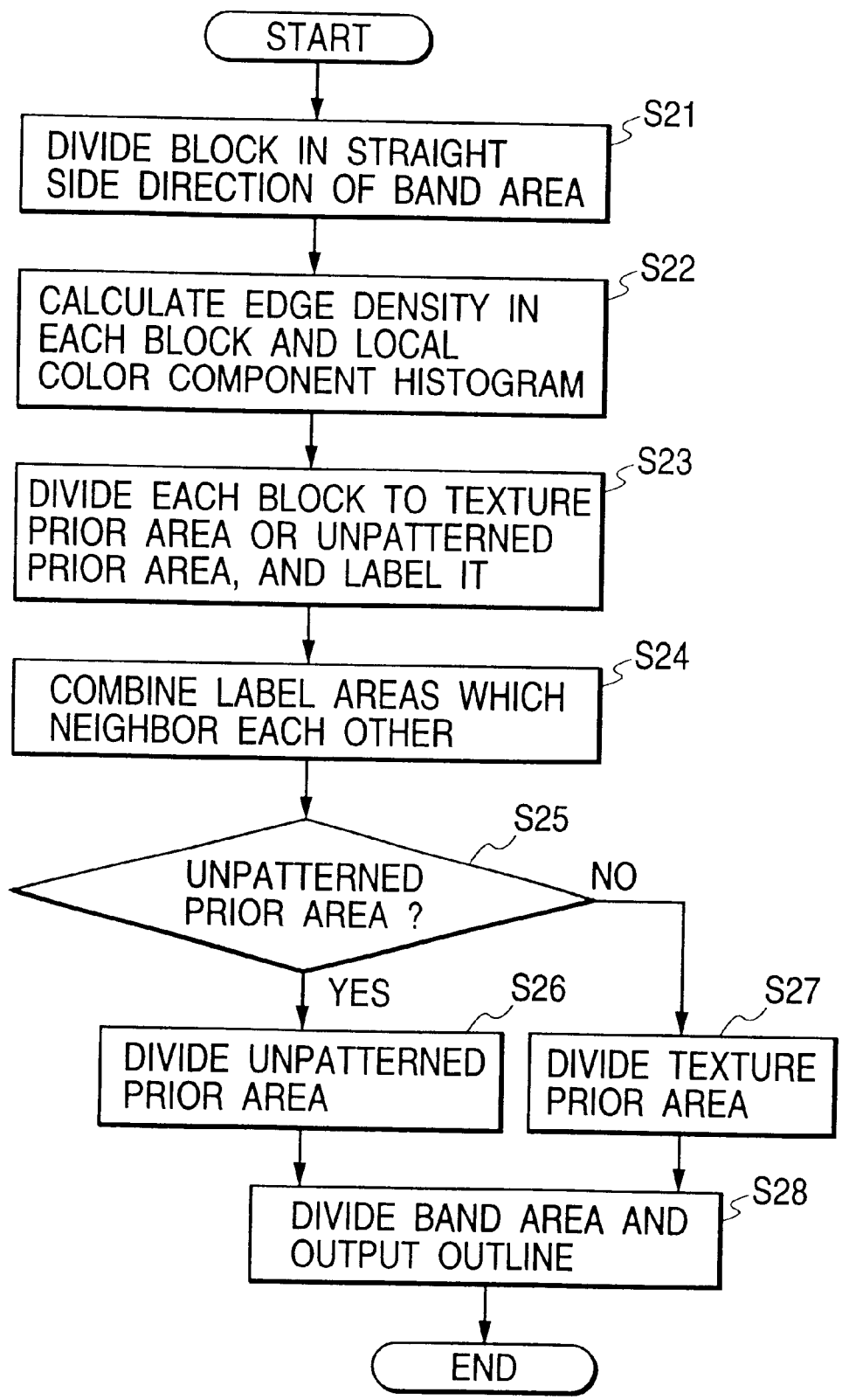
FIG. 14 is a flowchart showing the area division processing that is performed.

The area division process for this embodiment will now be described in detail while referring to the -flowchart in FIG. 14. First, the band area 1009 is longitudinally divided into blocks having a predetermined width (step S21). The edge density of each block and a histogram for a local color component (hue, etc.) are calculated (step S22).

The obtained edge density and the local hue histogram are employed to divide each block into a texture prior area (an area for which the edge density is greater than a predetermined threshold value) and a unpatterned prior area (an area for which the edge density is equal to or smaller than a threshold value), and these areas are labeled (step S23). When the areas having the same labels (the texture prior or unpatterned prior) are adjacent to each other, the combination process for synthesizing these labeled areas is performed (step S24).

A check is then performed to determine whether the labels of the individual areas are unpatterned prior areas (step S25). If they are unpatterned prior areas, they are divided further by using, as the boundary, the position where a change in the local color component is the greatest, or the position of the edge (step S26). If the areas are texture prior areas, they are also divided further by using, for example, a conventional method that will be described later (step S27). Finally, the obtained boundary line in the band area 1009 is output (step S28).

The conventional texture division method is, for example, a method employing calculation of a co-occurrence matrix and a split and merge algorithm (Segmentation By Texture Using A Co-Occurrence Matrix And A Split And Merge Algorithm, P. C. Chen and T. Pavidis, Computer Graphics And Image Processing, vol. 10, pp. 172–182, 1979).

As another texture division method, the separation ratio when the band area 1009 is divided along a predetermined boundary is defined (Japanese Patent Application Laid-Open No. 7-93561), and a boundary (more than one can be set) the separation ratio for which is greater than a threshold value is obtained.

In addition, only the above described texture division algorithm may be employed to consistently divide the band area 1009.

The outline renewal unit 1503 selects the outermost boundary among the division boundaries in the band area 1009, and linearly links the positions of the selected boundaries to renew the outline (step S8 in FIG. 12). The B spline function may be used to generate an interpolation curve that smoothly connects the representative points of the individual boundaries, so that the interpolation curve can be used as a renewed outline.

The renewed outline is increased to have a predetermined width and the resultant outline is superimposed on the input image on the image display unit 1003 (step S9). The user examines whether the true outline of the object is entirely included in the thick outline that is renewed and determines whether the outline should be renewed further (step S10). If all the renewed outline is not present on the true outline, it is assumed that the entire outline is to be further renewed (step S11). The user issues an instruction for overall renewal by depressing the return key that is the instruction selecting unit (step S12).

It should be noted that, when overall renewal of the outline is automated and the intermediate results are confirmed on the image display unit 1003, the operating mode may be shifted at a specific time to a partial renewal mode that will be described later, or that, only when the outline renewal is halted, a user may use the instruction selecting to issue an instruction for halting the outline renewal mode or for shifting to the operating mode.

If one part of the thick outline that is renewed at step S9 is present on the true outline and the other part is not present thereon, the operating mode is shifted to the partial renewal mode, in which the start point and the end point of an outline segment to be renewed are designated (step S13). For example, in an icon menu on the image display unit 1003, the start point and the end point are selected by manually using the instruction selecting unit 1004, and the pertinent locations on the image are designated by clicking the mouse. Then, the coordinates of the points are registered and displayed. The start point and the end point of an outline segment that is not renewed may be designated. In this case, the outline segment that is not designated is renewed in the following process.

Figure 15B:
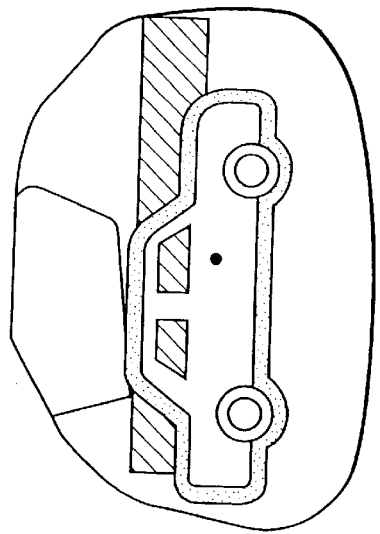
Figure 15C:
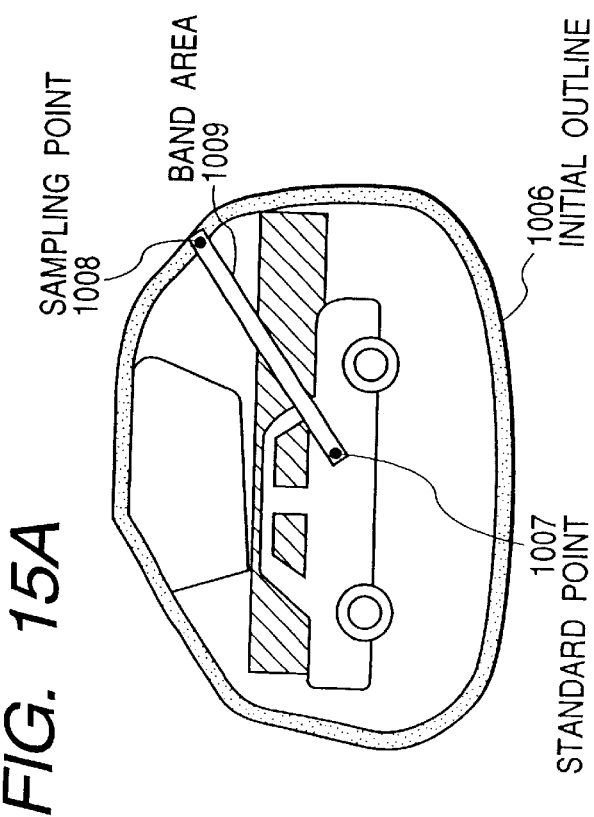

FIGS. 15B and 15C are diagrams showing examples results when a renewal interval start point 1011 and a renewal interval end point 1011 are set. Assume that the direction from the renewal interval start point 1011 to the renewal internal end point 1011 is determined to be counterclockwise, or by an instruction from a user (e.g., selecting the direction close to the direction in which the line is drawn using a mouse).

The outline renewal internal at step S13 can be automatically set for a substantially unpatterned background area. In this case, the point that is present on the renewed outline and is not present on the edge (very low edge strength) need only be registered as the start point and the end point of the renewal interval. Whether the background area is substantially unpatterned can be determined by examining the edge density (the density of present edges obtained by binary edge strength data) on a local area, which is obtained by increasing the width of the initial outline 1006 that is set.

Figure 15D:
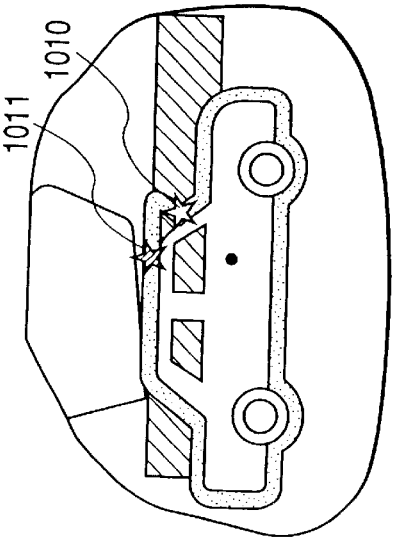

As is shown in FIG. 15D, when the true outline is include din the thick outline that is renewed, upon receiving an instruction by the user, the operating mode is shifted to the outline determination mode. The outline determination unit 1504 employs the image data for the thick outline to extract the outline of an object (step S14). Specifically, the outline determination unit 1504 traces a point that satisfies the continuity of the outline and has the extremely large edge strength (Japanese Patent Application Laid-Open No. 7-225847).

If the center line of the thick outline matches the true outline, this process (step S14) is not required, and the extraction process (area division extraction process) is thereafter terminated upon receiving an instruction by a user.

As another outline extraction method, a process (Japanese Patent Application Laid-Open No. 6-251149), for setting a local search area in the thick outline and for employing the clustering method to select the boundary point that has the greatest separation ratio in the widthwise direction of the thick outline, may be performed, while the local search area is freely shifted along the center line of the thick outline.

In addition, when the sampling points on the thick outline that is renewed are present on the true outline, the outline tracing process (edge tracing or edge linking process) in which the sampling points are sequentially passed through may be performed.

Furthermore, when one part of the thick outline that is renewed is present on the true outline, the outline determination process at step S14 may be performed at the pertinent interval.

In the above explanation, the initial outline 1006 that is set first is gradually reduced and converged on the outline of the object. Similarly, the procedures may be so set that the initial outline is expanded and is converged to the outline of an object.

That is, a closed curve in an arbitrary shape is set as the initial outline inside an object, and a predetermined band area is set where the sampling point on the initial outline and the standard point inside the closed curve are present. It should be noted that, from the view of the standard points, the top end position of the bank area is always farther from the sampling point. The band area is divided in the same manner as described above, and the position of a division point that exists innermost from the standard point and outside the sampling point is selected as the position of the sampling point of the renewal outline. The connection of renewed points and generation of a renewal outline are repeated. The other processing is the same as in the above embodiment.

As is described above, according to the present invention, if a user first sets a curve enclosing an object, the semi-automated process as to whether the outline should be renewed or to set the portion to be renewed is only required. As a result, the outline of an object can be correctly extracted with a small number of steps, regardless of a complicated background image pattern or of the complicated shape of an object. Furthermore, compared with the conventional method for dividing an image into areas, the division results for a more limited local area can be employed so that the processing time can be considerably reduced.

(Fifth Embodiment)

In a fifth embodiment, when the renewal position of a sampling point on the outline is to be determined in a specific band area, the unity for the characteristic amounts (which will be described later) is estimated based on a predetermined distribution of the characteristic amounts that is obtained by dividing another band area, and the dividing position having the greatest estimation value is selected. The processing performed by the outline renewal unit 1503 will now be described while referring to the flowchart in FIG. 16. The other processing is the same as for the fourth embodiment.

Figure 16:
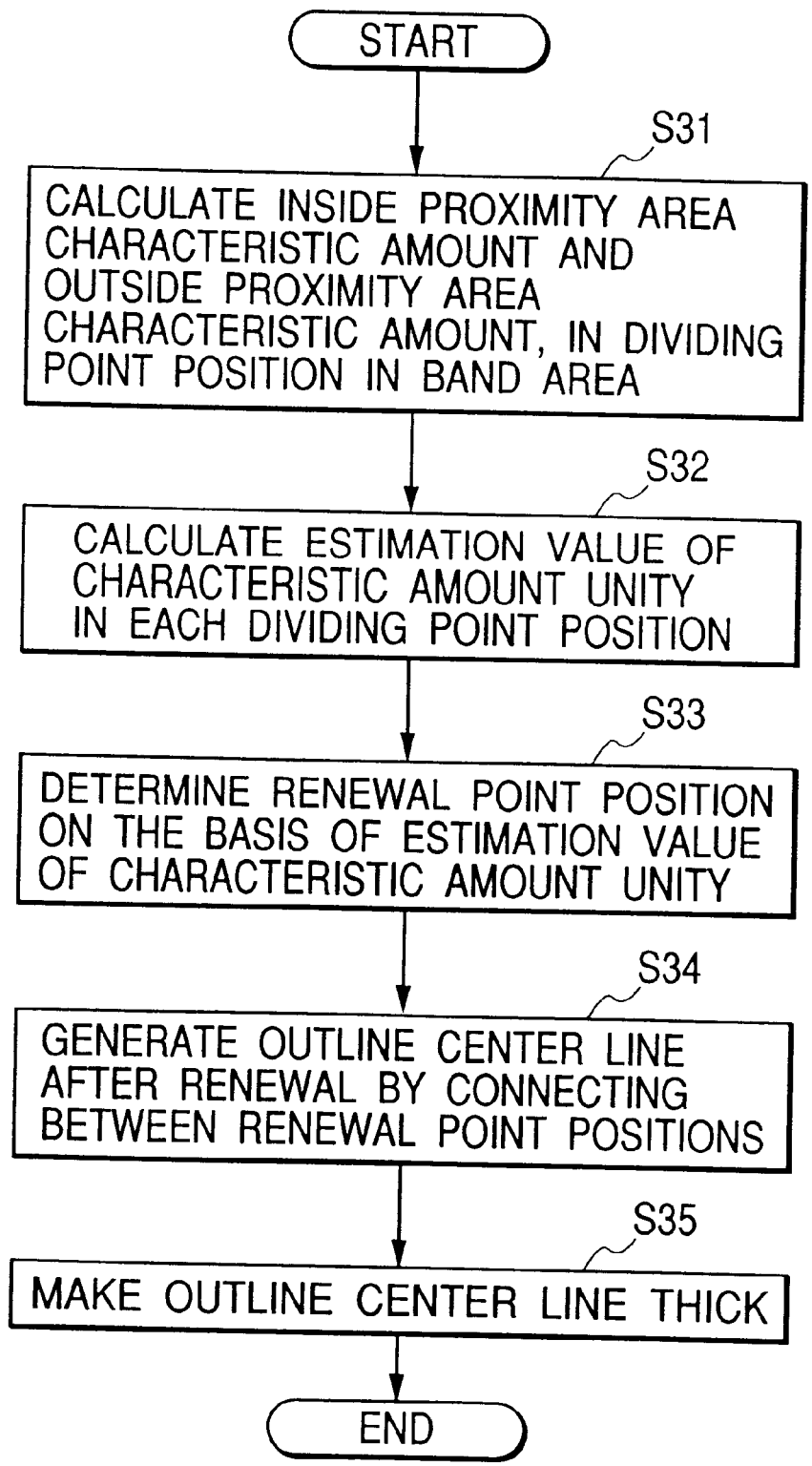
FIG. 16 is a flowchart showing the outline updating processing performed according to a fifth embodiment.

In FIG. 16, first, the characteristic amount is calculated for the proximity areas inside and outside each dividing point position in each of the band areas 1009 (step S31). The characteristic amount is, for example, the edge density in the pertinent proximity area and a hue value having the maximum frequency in the local hue histogram. When the characteristic amount is the same as that used for the area division process, it does not have to be calculated again, and the results obtained may be employed.

The estimation value is calculated for the characteristic amount unity at each dividing point position in the band area 1009 (step S32). Hereinafter, assume that $F^{OUT}(k, j, m)$ denotes the m-th characteristic amount in the outside proximity area at the j-th dividing point position from the outermost position in the k-th band area; $F^{IN}(k, j, m)$ denotes the m-th characteristic amount in the inside proximity area; Q denotes the number of parameters of the characteristic amount; and $J_k$ denotes the number of divisions in the k-th band area. Then, the character amount unity C(k, j) at the j-th dividing point position in the pertinent band area is represented by equation (1).

[Equation 1]

$$C(k, j) = \sum_{r=\{in,out\}} \sum_{p=1}^{J_k} \sum_{q=1}^{Q} \left( \frac{1}{|F^r(k-l, p, q) - F^r(k, j, m)| + \varepsilon} + \frac{1}{|F^r(k+l, p, q) - F^r(k, j, m)| + \varepsilon} \right) \quad (1)$$

It should be noted that $\varepsilon$ is a micro-constant of, for example, a value of 0.01, and k satisfies $2 \leq k \leq K-1$ (the total number of band areas). Assume that, when k is a value of 1, the denominator of the first term in equation (1) is $|F^r(K,p,q) - F^r(k, j,m)| + \varepsilon$, and that, when k is a value of K, the denominator of the second term in equation (1) is $|F^r(l,p,q) - F^r(k, j,m)| + \varepsilon$.

The thus defined characteristic amount unity C(k,j) has a greater value as the characteristic amounts inside and outside the j-th dividing point position in the k-th band area greatly differ from the characteristic amounts inside and outside the dividing point positions in two other adjacent band areas. The characteristic amount unity C(k, j) may be defined by equation (2) or (3).

[Equation 2]

$$C(k, j) = \sum_{r=\{in,out\}} \sum_{p=1}^{J_k} \sum_{q=1}^{Q} \left( \frac{1}{|F^r(k-l, p, q) - F^r(k, j, m)| + \varepsilon} \right) \quad (2)$$

[Equation 3]

$$C(k, j) = \sum_{i \in N_k} \sum_{r=\{in,out\}} \sum_{p=1}^{J_k} \sum_{q=1}^{Q} \left( \frac{1}{|F^r(i, p, q) - F^r(k, j, m)| + \varepsilon} \right) \quad (3)$$

In equation (2), in the process for sequentially authenticating the dividing point positions, only the characteristic amount data concerning the immediately preceding band area is employed to estimate the characteristic amount unity C(k, j). In equation (3), $N_k$ that indicates the range of "i" represents a set of index values in a nearby band area that is taken into account for a specific band area. The elements in $N_k$ are values other than k. It should be noted that when $N_k = \{k-1, k+1\}$, equation (3) is equal to equation (1), and that similarly, equation (2) is established in a case of $N_k = (k-1)$ in equation (3).

Following this, based on the thus obtained estimation value of the characteristic amount unity C(k, j), the optimal dividing point position in each band area 1009 is determined to be a renewal point position in the pertinent band area 1009 (step S33). Specifically, j for which the estimation value of the characteristic amount unity C(k, j) is maximum, i.e., j in equation (4), is selected for optimal dividing point position $j_{out,k}$ in the k-th band area 1009.

[Equation 4]

$$j_{opt,k} = \underset{(j)}{\mathrm{argmax}} C(k, j) \quad (4)$$

Finally, the dividing point positions that are obtained are linked together to acquire the center line of the outline that is renewed (step S34). The renewed outline is obtained by making the center line thick (step S35).

In the fifth embodiment, since the dividing point position is selected for renewal of an outline, the line can be converged to the outline of an object area more quickly and correctly than in the fourth embodiment for sequentially selecting the outermost dividing point position. Especially when one part of the thick outline that is renewed is present on the true outline, in equation (3), the value of $N_k$ is updated each time the outline is renewed, so that, for the interval of an outline to be renewed at the next step, $N_k$ is a set of the index of a band area, in which the authenticated dividing point position is included, and the index of the nearest band area. Then, the processing speed and the accuracy are more improved.

In the above equations, the estimation value of the characteristic amount unity C(k, j) is obtained while taking into account the image characteristic amounts inside and outside the boundary at the dividing point position. However, the estimation value may be defined while taking into account the continuity of the image characteristic amount on one side (e.g., only inside characteristic amount).

Figure 17:
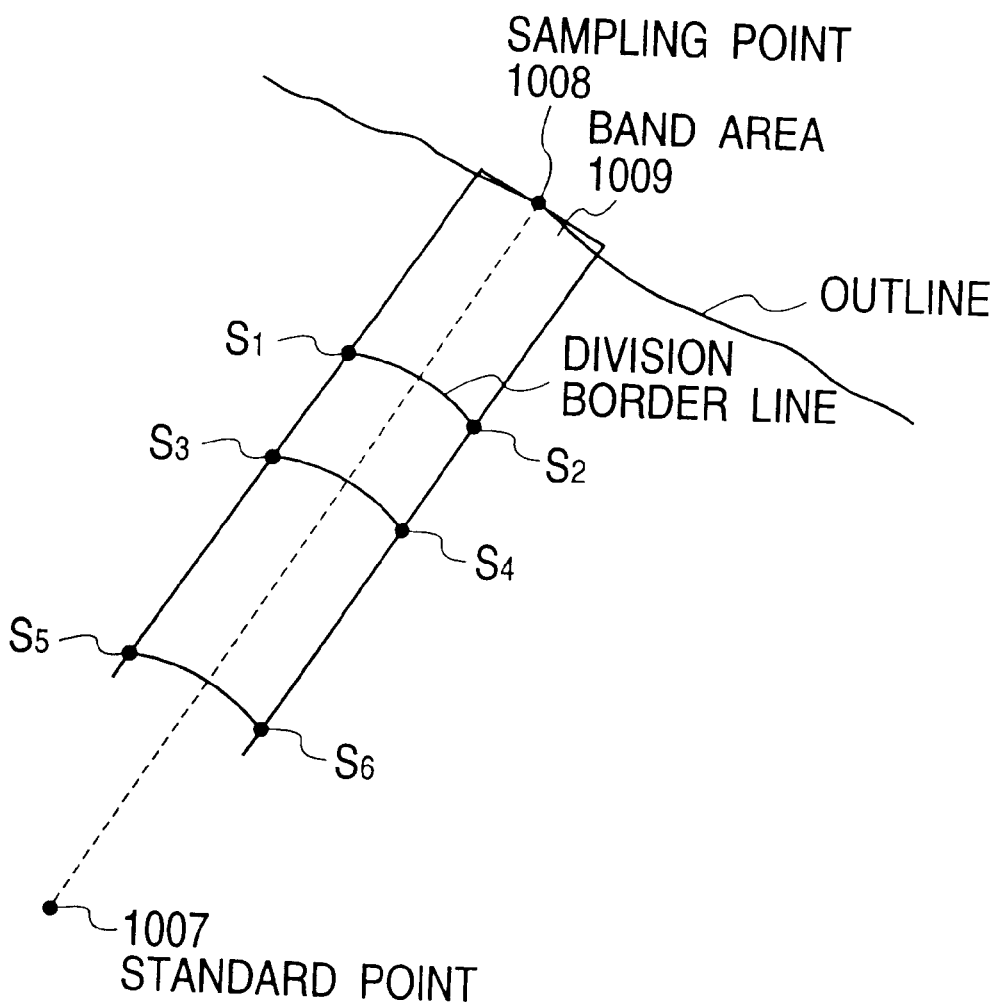
FIG. 17 is a diagram showing division points positions along the boundary of a band area.

Furthermore, if the dividing point positions (points $S_i$ in FIG. 17) on the border line in the band area 1009 are included as the characteristic amount, the estimation value of the characteristic amount unity C(k, j) can be represented by a specific equation, so as to estimate the continuity of the shape of the renewed outline in addition to the continuity of the image characteristic amount. That is, in this case, equation (5) is employed instead of equation (3).

[Equation 5]

$$C(k, j) = \sum_{i \in N_k} \sum_{p=1}^{J_k} \sum_{q=1}^{Q} \left( \frac{1}{|F(i, p, q) - F(k, j, m)| + \varepsilon} \right) \quad (5)$$

In equation (5), assume that characteristic amount F(i,p,q) does not distinguish the inside and outside of the border line, and various types of characteristic amounts are represented by index q. The element corresponding to equation (1) or (2) may be employed as neighbor $N_k$.

The scale concerning the estimation of the characteristic amount unity among the band areas for selecting the dividing point positions is not limited to the equations that are defined above.

(Sixth Embodiment)

According to a sixth embodiment, a resolution is first set low for the area division process, and is increased as the number of renewals of the outline is increased. Further, the number of sampling points on the outline is also increased for each renewal, and the sampling interval is reduced. The processing for this embodiment from setting a standard point to renewal of an outline will now be described while referring to the flowchart in FIG. 18.

Figure 18:
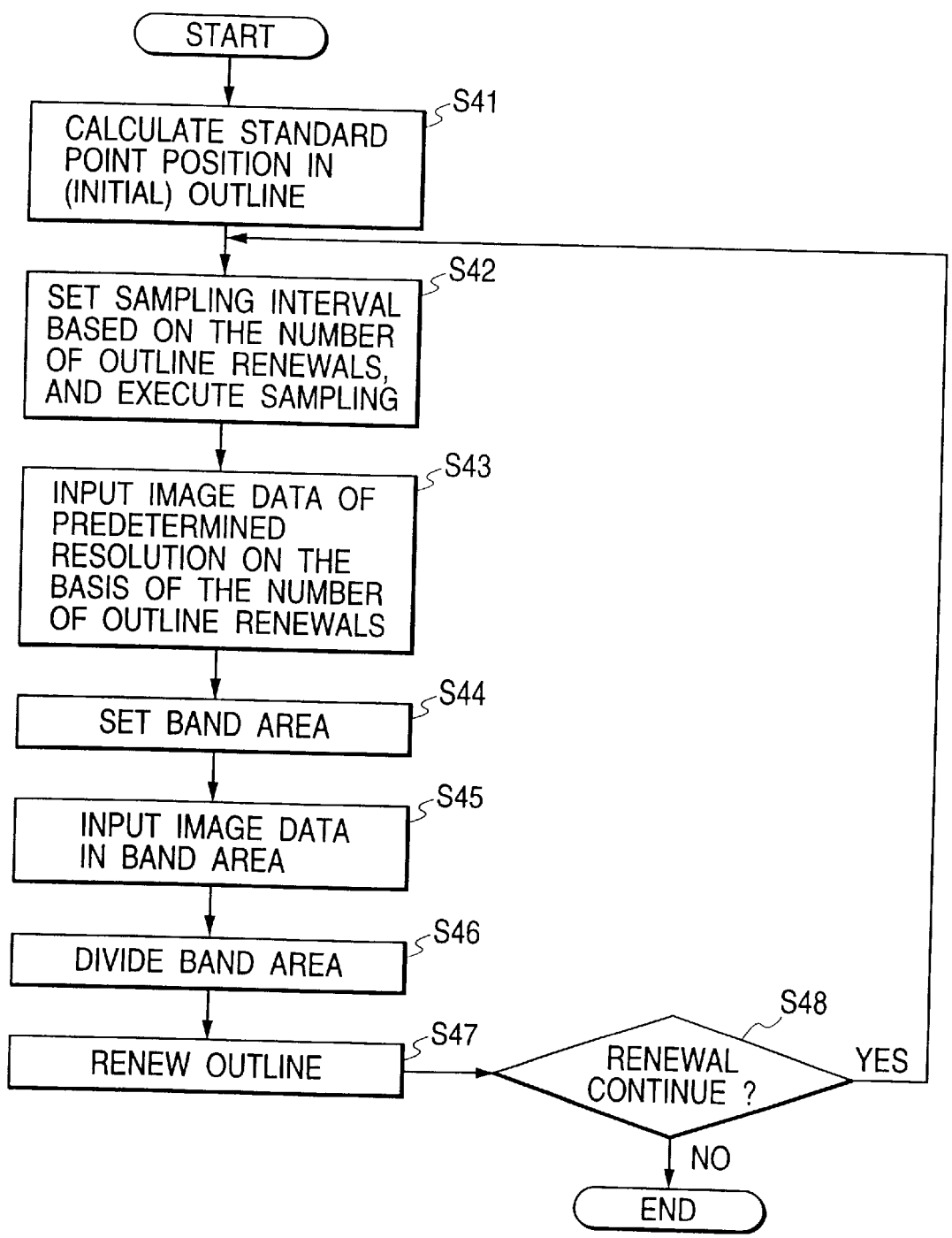
FIG. 18 is a flowchart showing the processing performed from the setting of a standard point to the updating of an outline according to a sixth embodiment.

In FIG. 18, first, the standard point setting unit 1507 calculates the position of the center of gravity of the initial outline 1006 as the position of the standard point 1007 (step S41). In accordance with the number of renewals of an outline, the band area setting unit 1508 performs sampling on the points on the outline at a predetermined interval, so that the lengths (forward path length) between the points along the outline are equaled (step S42).

Specifically, when the first number of dividing points is N, the number of dividing points with the number of renewals being M is set as WN(M−1) (specifically, W is a constant of, for example, "2"). When the circumferential length of the outline is S, the sampling interval is set to S/(WN(M−1)). When the polar coordinate system is set while the position of the center of the gravity is the standard point and when sampling is to be performed at a constant angle interval, the sampling interval is 360/(WN(M−1)) degrees.

The band area setting unit 1508 receives image data with a predetermined resolution in accordance with the number of renewals of the outline (so as to increase the resolution as the number of renewals is increased) (step S43). For example, image data having different resolutions may be generated from an input image in advance in the intermittent interpolation process, and image data having a corresponding resolution may be selected and entered. The band area 1009 that employs, as the center, a line segment connecting the sampling point 1008 and the standard point 1007 is set (step S44).

The area division unit 1502 obtains image data for the pertinent band area 1009 (step S45), and employs the image data having a specific resolution to divide the band area 1009 longitudinally (the direction of the line segment connecting the standard point 1007 and the sampling point 1008) (step S46). The same area division method as used for the fourth embodiment is employed.

The outline renewal unit 1503 performs renewal of the outline in the same manner as in the fourth or the fifth embodiment (step S47). To continue renewal (step S48), program control returns to step S42, and the above process is repeated. At step S47, the outline renewal unit 1503 selects, for example, the optimal dividing point position in the same manner as in the fifth embodiment.

In this embodiment, the interval in which the thick outline that is renewed does not include the true outline is designated in the same manner as in the fourth embodiment. However, the renewal of the outline may be performed always for all the intervals. In this case, image data having a new resolution are entered for each renewal of the outline. Thus, even if the true outline is present in the thick outline at the previous resolution, the center line of the thick line can more accurately approximate to the true line by performing area division with the new resolution.

For the setup of a border line having a directional element that substantially intersect with the direction of a line segment that connects the sampling point and the standard point in order to improve the accuracy of the position of the outline, the area division need be performed only in a range within the width of thick line or in a range a several times as large as that range.

(Seventh Embodiment)

According to a seventh embodiment, assume that a plurality of standard points 1007 can be set. When there are a plurality of standard points 1007 to set the band area 1009, a standard point having a short distance to the sampling point 1008 is automatically selected. Particularly when an object to be extracted is elongated or complicated, an additional standard point 1007 is placed at an appropriate position, so that the correct shape of the object, even if it is complicated, can be automatically obtained.

Figure 19:
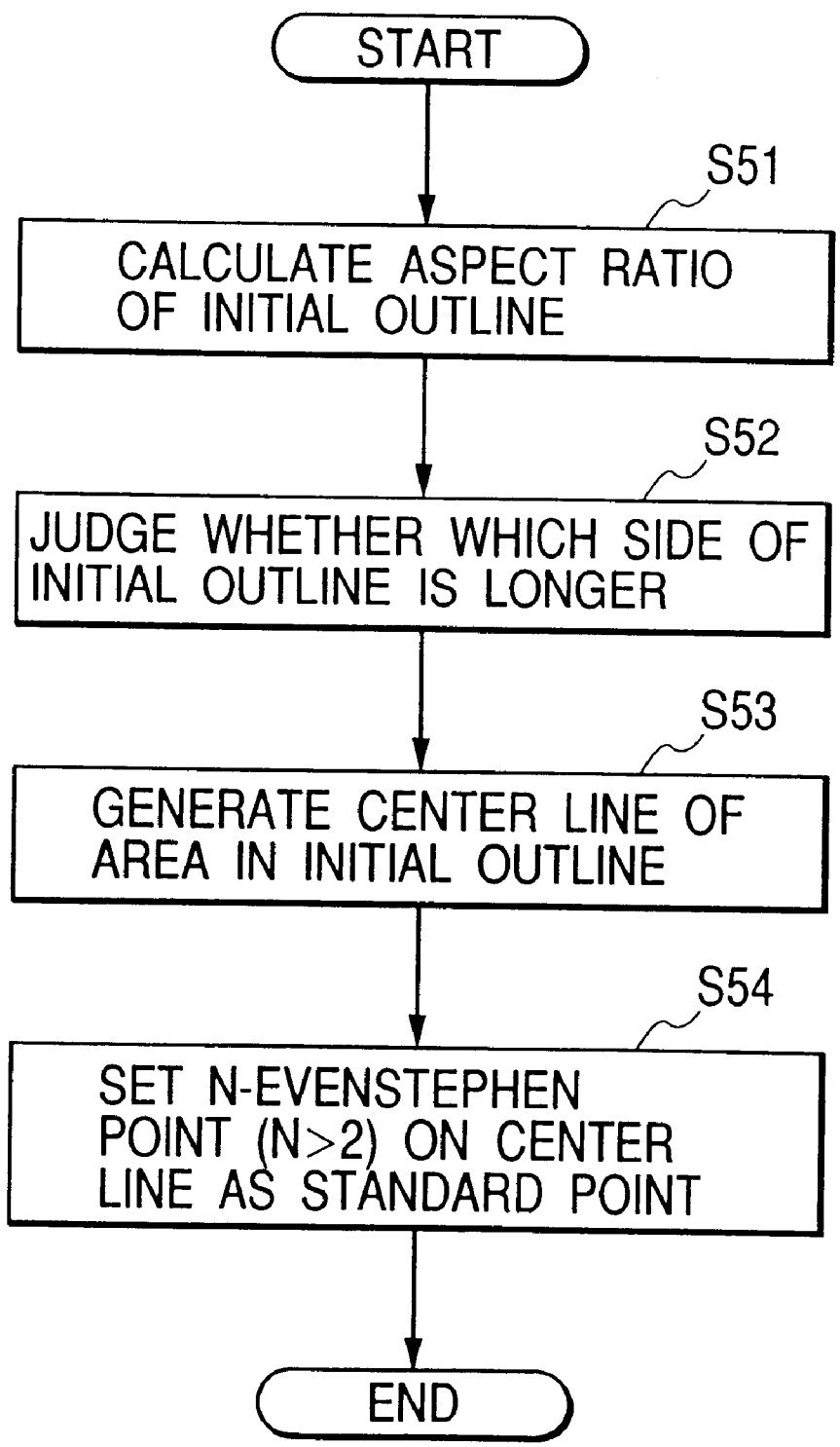
FIG. 19 is a flowchart showing the standard point setting processing performed according to a seventh embodiment.

The processing performed by the standard point setting unit 1507 will now be described while referring to FIG. 19. In FIG. 19, fist, before setting the initial outline 1006, the smallest rectangular area that contacts the outline 1006 is considered. Then, a check is performed using the aspect ratio of the initial outline 1006 to determine whether the shape of an area enclosed by the initial outline 1006 is vertically long or horizontally long (step S51). When, for example, the aspect ratio is equal to or greater than 1, the area is determined to be horizontally long.

Then, a check is performed to determine whether the aspect ratio falls outside a predetermined range (e.g., equal to or greater than 2, or equal to or smaller than 0.5) (step S52). If the aspect ratio falls outside the predetermined range, the center line of the area is generated vertically or horizontally depending on the shape of the area (step S53). For the vertically long area, for example, the midpoint of the border points (two points) of the outline is obtained for each vertical position, and the center curve is obtained. Then, N-even stephen points for the thus obtained center line are set as standard points 1007 (step S54). The standard point setting process is thereafter terminated.

After setting the initial outline 1006, a user may set the standard point 1007 at an arbitrary appropriate position in the outline. Particularly in this case, it is preferable that the standard point 1007 be superimposed on the input image and be displayed uniquely on the image display unit 30 to identify the position of the standard point 1007 (for example, the position of the standard point 1007 and its vicinity is displayed with colors and brightness differently from the extracted area).

(Eighth Embodiment)

According to an eighth embodiment, the outline of an object is determined in the dynamic outline process (which will be described later) for a thick outline area after the outline renewal process has been performed. Since the processing until the outline renewal process is the same as in the above embodiments, no further explanation will be given.

The dynamic outline method ("Snakes: Active Contour Models", M. Kass, A. Witkin and D. Terzopoulos, International Journal of Computer Vision, pp. 321–331, 1988) is a method for extracting the outline of an object from edge information. According to this method, an outline model is modified to minimize the energy estimation function that is represented while a smooth outline and the presence of such an outline on an edge are restriction conditions, so that the outline model is converged to the outline of the object. Assume that length s along the outline from a predetermined standard point on the center line of the thick outline is used as a parameter, and that coordinates of point v(s) on the center line are provided as (x(s), y(s)). Then, the energy function is represented by equation (6).

[Equation 6]

$$E = \sum_i (E_{int}(s_i) + E_{image}(s_i) + E_{ext}(s_i)) \quad (6)$$

In equation (6), $s_i$ represents the value of the circumferential length along the outline that corresponds to the position of the i-th sampling point on the outline. $E_{int}$ denotes internal energy with which an outline model is to be smoothed, and is represented by equation (7).

[Equation 7]

$$E_{int}(s) = \alpha(s)\left|\frac{dv}{ds}\right|^2 + \beta(s)\left|\frac{d^2v}{ds^2}\right| \quad (7)$$

$E_{image}$ denotes energy that represents the force for attraction toward the edge, and is represented by equation (8).

[Equation 8]

$$E_{image}(s) = -w|\nabla I(v(s))|^2 \quad (8)$$

I(v(s)) represents the pixel value at point v(s), and values of α(s), β(s) and w are set by a user. $E_{ext}(s)$ corresponds to the external force, and is set as needed. In this embodiment, assuming that the inside of the thick outline is an object area and outside is the background area, $E_{ext}(s)$ is defined by equation (9).

[Equation 9]

$$E_{ext}(s) = -\gamma\{lnP_{in,s}(I(v(s))) - lnP_{out,s}(I(v(s)))\} \quad (9)$$

γ is a positive constant. $P_{in}(I(v(s)))$ and $P_{out}(I(v(s))))$ are represented by equation (10) while using average values $\mu_{in,Ns}$ and $\mu_{out,Ns}$ and scattered values $\sigma_{in,Ns}$ and $\sigma_{out,Ns}$ of individual pixel values of local images in the proximity areas inside and outside of the thick outline. $N_s$ denotes a proximity area for which the average values and scattered values are obtained in accordance with point v(s).

[Equation 10]

$$P_{\{in,out\},s} = \frac{1}{\sqrt{2\pi}\,\sigma_{\{in,out\},N_s}} \exp\left[\frac{-\{I(v(s)) - \mu_{\{in,out\},N_s}\}^2}{2\sigma^2_{\{in,out\},N_s}}\right] \quad (10)$$

With equation (10), equation (9) means that force for expanding outwardly acts on the outline when it is highly probable that the sampling point on the outline exists on the image in the proximity area inside the thick outline, and that the force for shrinking inwardly acts on the outline when it is highly probable that the sampling point on the outline exists on the image in the proximity area outside the thick outline. Equation (10) can be regarded as a function for estimating a difference between the image characteristic amount (e.g., a pixel value) at specific sampling point v(s) and the image characteristic amount (e.g., the average of pixel values) in the inside or outside proximity area. In this sense, another scale may be employed for estimating the difference of the image characteristic amounts concerning the sampling point and the proximity area. The model in equation (10) is a Gaussian model; however, another model may be employed.

Figure 20A:
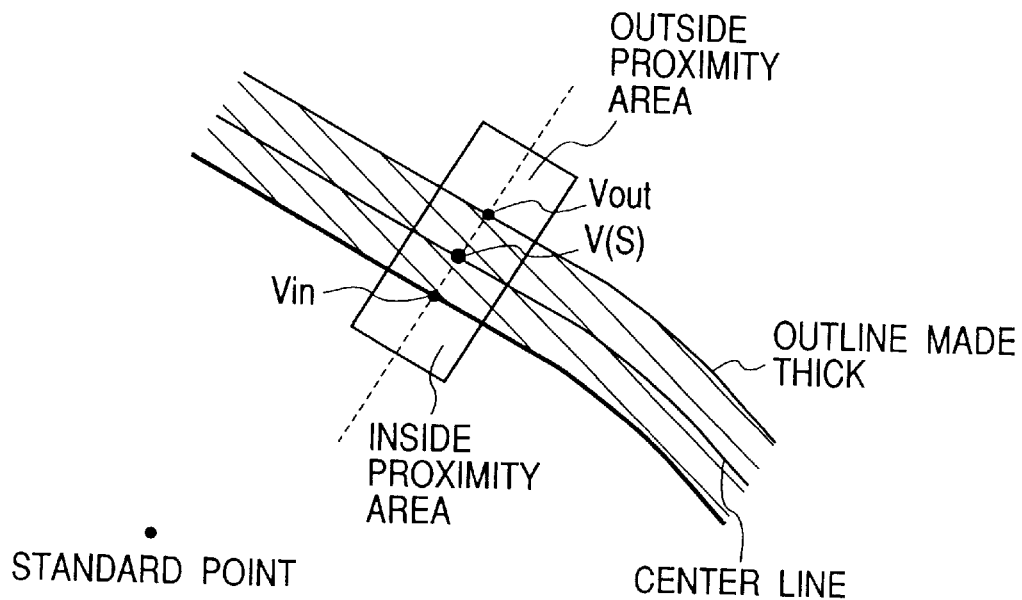
FIGS. 20A and 20B are diagrams for explaining inside and outside proximate areas corresponding to sampling points on an outline according to an eighth embodiment.

An explanation will now be given while referring to FIGS. 20A and 20B for the processing for setting the inside and outside proximity areas for point v(s). In this embodiment, as is shown in FIG. 20A, the proximity areas for point v(s) along the center line are local areas each of which has a width of about ten pixels outside the thick outline area and in the normal direction of the thick outline, and which has a length of about ten pixels in the direction of the thick outline while employing, as the center point, intersection $v_{in}$ or $v_{out}$ of the normal line of the center line that passes through point v(s) and the border line of the thick outline area. The average value of the pixel values and scattering of pixel values are obtained for images in the local areas that are defined.

Figure 20B:
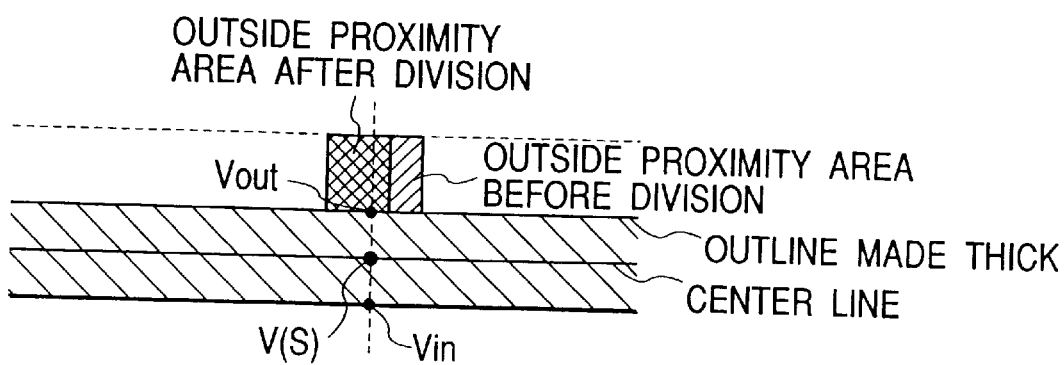

When a histogram for pixel values (hue and luminance values) in the proximity area has a plurality of peaks, as is shown in FIG. 20B, the border line is defined to separate an area where a difference from the pixel value providing the maximum peak is small (equal to or smaller than a threshold value) and an area where the difference is large, and local areas where the intersections belong are defined as proximity areas. If the proximity area in the direction of the outline is very short, the local area may be enlarged toward the outline until the length is, for example, ten pixels, and the same division process as in FIG. 20B may be performed based on the pixel value histogram for the local area.

As is described above, as the results of the outline renewal process based on the division of the band area, the area inside the thick outline is determined to an area to be extracted, and the outside area is determined to be a background area. Then, the dynamic outline process is performed whereby the difference between the inside and outside image characteristic amounts is reflected as external force (equations (9) and (10)). Therefore, the accurate outline to be extracted can be automatically obtained.

(Ninth Embodiment)

According to a ninth embodiment, when the interval for an outline to be renewed is designated after the outline renewal process has been performed based on the division of the band area, the points on the outline at that interval are employed to expand an area or select an area inwardly to the closed outline.

In the selection process, the permissible range is set with the distribution range of pixel values for a local area that employs, as the center point, the sampling point on the outline at the renewal interval. Pixels in the closed outline having a pixel value (RGB value or a hue or luminance value) that falls in the permissible range are extracted as selected areas. From among these areas, an area that is involved in an area linked with the sampling point is registered as a background pixel. The border line between the background and the object that are thus obtained is considered as the satisfactorily approximate to the outline of an area to be extracted.

The area expansion process is a process for synthesizing and expanding, inwardly the closed outline, a proximity area for a sampling point having a pixel value (or a characteristic amount) that is similar to a pixel value (or an image characteristic amount) of a local area (e.g., a thick area), which is located at the sampling point of the outline (or in the vicinity) or which employs, as the center line, the outline designated at the renewal interval.

Figure 21:
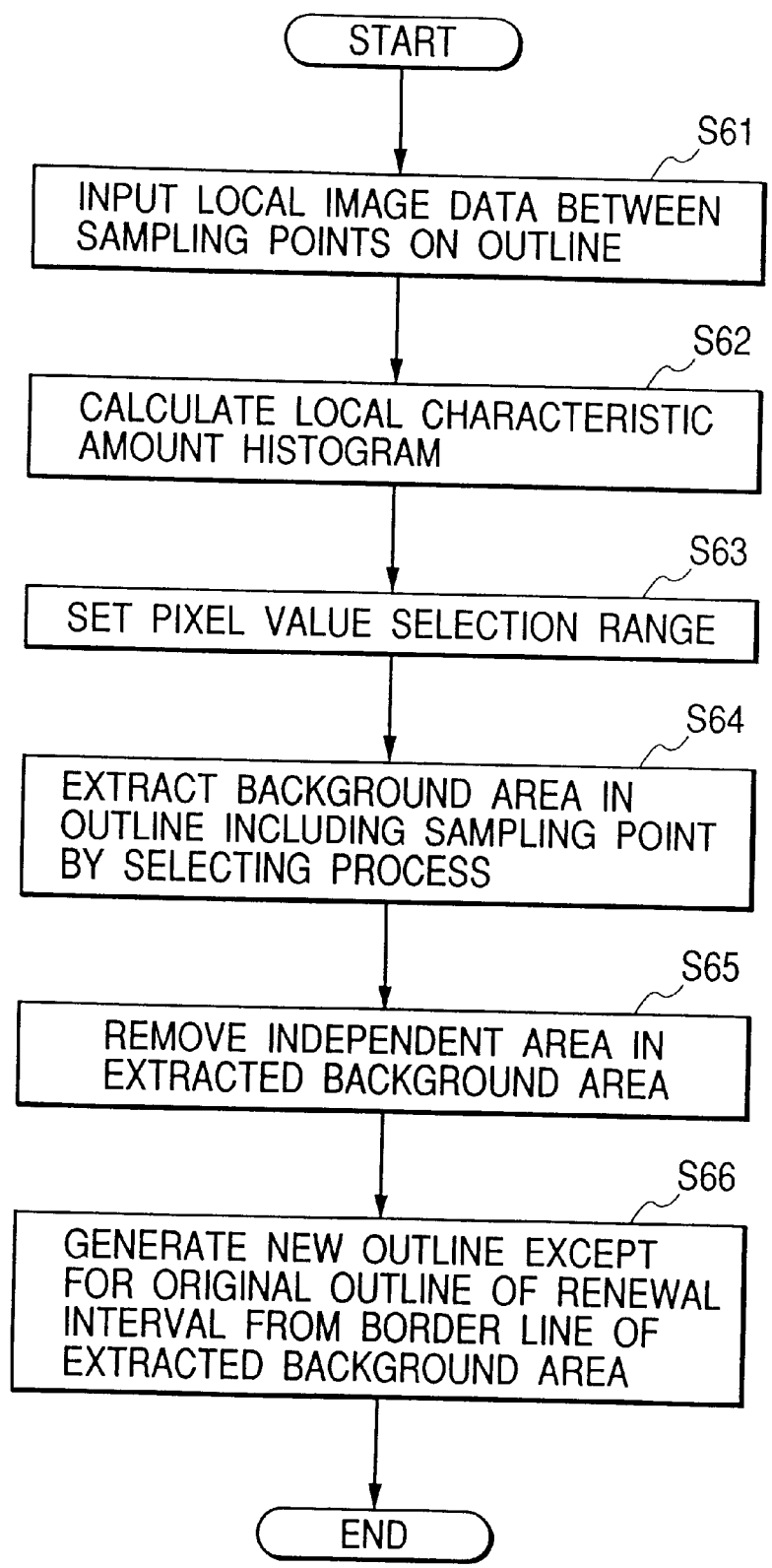
FIG. 21 is a flowchart showing the outline updating processing performed according to a ninth embodiment.

FIG. 21 is a flowchart showing the outline renewal processing according to this embodiment. In this embodiment, at the interval of the sampling points on the outline, local image data are obtained for a thick line area (step S61). A histogram for the characteristic amount (e.g., a hue or luminance value) is calculated for the obtained local image data (step S62). The pixel value providing the peak frequency (if a plurality of such pixel values are present, a pixel value providing the half of the maximum frequency or the second maximum frequency) is employed as the center point to set the pixel value selection range (step S63).

Then, an area having a pixel value that falls in the selection range is extracted as a background pixel, and the above described selection process is performed for that pixel (step S64). If an island-like isolated area is generated in the selected area, it is converted as a background area (step S65). Following this, a new outline, except for the outline at the renewal interval, is obtained by employing the border line of an area that is formed by the background area including the sampling point on the outline and the renewal interval for the outline (step S66).

As a result, with a small amount of calculations, the correct outline for an object can be obtained even for an area where the outline at a renewal interval has a texture pattern other than a solid pattern.

A pixel value histogram is calculated for the proximity area for the standard point. If the selection pixel value range obtained based on the histogram substantially matches the above pixel value range, preferably, the above selection process should not be performed because the border between an area to be extracted and the background tends to be unclear with a low contrast.

As is described above, since the outline renewal process based on the division of the band area and the area selection or the area expansion process are performed together, the shape of a complicated object can be automatically and easily extracted.

(Other Embodiment)

The present invention can be applied either for a system that is constructed by a plurality of apparatuses (e.g., a host computer, an interface device, a reader and a printer) or for an apparatus including a single device (e.g., a personal computer).

The following is also included within the scope of the present invention: in order to operate various devices to implement functions in the above embodiments, software program code for implementing the functions in the previous embodiments are supplied to a computer (a CPU or an MPU) in an apparatus or in a system that is connected to various devices, and in consonance with the program, the computer in the system or the apparatus operates the devices to accomplish the functions in the above embodiments.

In this case, the software program code accomplishes the functions of the above described embodiments. And the program code and means for supplying the program code to the computer, e.g., a storage medium on which such program code is recorded, constitute the present invention. A storage medium for supplying such program code can be, for example, a floppy disk, a hard disk, an optical disk, a magneto-optical disk, a CD-ROM, a magnetic tape, a non-volatile memory card, or a ROM.

In addition, not only for a case where the functions in the previous embodiments can be performed when program code is read and executed by the computer, but also for a case where, according to an instruction in the program code, an OS (Operating System) running on the computer, or another application software program, interacts with the program code to accomplish the functions in the above embodiments, this program code can be included in the embodiments of the present invention.

Furthermore, the present invention includes a case where program code, read from a memory medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

As is described above, only when the initial outline is roughly set to enclose an object to be extracted or to exist inside the area of the object, a process is repeated for renewing the limited number of sampling points on the outline to the positions of the border points that are obtained by dividing a band area that is set in the direction of the standard point inside the outline. Thus, even for a complicated object, the outline that approximates to that can be automatically obtained with a small amount of calculations, and the outline that is renewed can be correctly converged to the correct outline of the object.

In addition, after the outline is set to enclose the object to be extracted or to exist inside the area of the object, a user need only monitor the outline that is sequentially renewed and modified and issue a simple instruction to halt or start (or resume) the renewal. Thus, a labor required for extraction of an object can be considerably reduced.

What is claimed is:

1. An image processing apparatus comprising:

input means for entering information for a designated position on an image;

extraction means for extracting boundary segments of the image in accordance with the information that is entered and one or more characteristics of the image, said extraction means selectively using a plurality of types of extraction;

decision means for deciding whether to authenticate each boundary segment extracted by said extraction means as part of an outline; and processing means for linking a plurality of boundary segments authenticated by said decision means, and for determining limits of a closed area, wherein said extraction means performs a plurality of types of extraction processes in parallel for a single image.

2. An image processing apparatus according to claim 1, wherein said decision means includes selection means for selecting one boundary segment extracted by said extraction means to be authenticated as part of the outline, wherein the boundary segment to be selected is determined by a manual instruction of a user.

3. An image processing apparatus according to claim 1, wherein the one or more characteristics of the image is one or more of a density, a color or a texture.

4. An image processing apparatus according to claim 1, wherein the information for the position is entered by a user, and is either one point in an image, outline tracing, dot formation or enclosing.

5. An image processing apparatus according to claim 1, wherein a decision is made by said decision means for a plurality of boundary segments that constitute the outline.

6. An image processing apparatus according to claim 1, wherein the plurality of types of extraction processes include an area base type, a trace type and an enclosure line type.

7. An image processing apparatus according to claim 1, wherein said processing means includes inquiry means for confirming whether a determined closed area is to be corrected, and wherein, in accordance with the results of the inquiry, said processing means corrects the closed area.

8. An image processing apparatus according to claim 1, wherein an end of the outline that is formed by the authenticated boundary segments is displayed on a display device so it can be identified.

9. An image processing apparatus according to claim 8, wherein the end point of the outline is displayed by using a figure symbol.

10. An image processing method comprising:

an input step of entering information for a designated position on an image;

an extraction step of extracting boundary segments of the image in accordance with the information that is entered and one or more characteristics of the image, said extraction step selectively using a plurality of types of extraction;

a decision step of deciding whether to authenticate each boundary segment extracted in said extraction step as part of an outline;

a processing step of linking a plurality of boundary segments authenticated in said decision step, and of determining limits of a closed area, wherein said extraction step performs a plurality of types of extraction processes in parallel for a single image.

11. A computer-readable storage medium on which an image processing program is stored, said image processing program comprising:

an input step of entering information for a designated position on an image;

an extraction step of extracting boundary segments of the image in accordance with the information that is entered and one or more characteristics of the image, said extraction step selectively using a plurality of types of extraction;

a decision step of deciding whether to authenticate each boundary segment extracted in said extraction step as part of an outline;

a processing step of linking a plurality of boundary segments authenticated in said decision step, and of determining limits of a closed area, wherein said extraction step performs a plurality of types of extraction processes in parallel for a single image.

* * * * *

UNITED STATES PATENT AND TRADEMARK OFFICE
CERTIFICATE OF CORRECTION

PATENT NO. : 6,674,902 B1
DATED : January 6, 2004
INVENTOR(S) : Kondo et al.

It is certified that error appears in the above-identified patent and that said Letters Patent is hereby corrected as shown below:

<u>Title page,</u>
Item [54], Title, "APPARATUS" should read -- APPARATUS, --.

<u>Column 1,</u>
Line 1, "APPARATUS" should read -- APPARATUS, --;
Lines 40 and 47, "can not" should read -- cannot --.

<u>Column 2,</u>
Lines 17 and 18, "can not" should read -- cannot --.

<u>Column 5,</u>
Line 61, "formed" should read -- formed when --.

<u>Column 8,</u>
Line 27, "on" should be deleted; and
Line 28, "can not" should read -- cannot --.

<u>Column 9,</u>
Line 34, "ware" should be deleted; and
Line 62, "entered" should read -- entered by --.

<u>Column 10,</u>
Line 9, "in" should read -- is --.

<u>Column 11,</u>
Line 5, "-flowchart" should read -- flowchart --; and
Line 42, "above described" should read -- above-described --.

<u>Column 12,</u>
Line 35, "include" should read -- included --; and
Line 36, "din" should read -- in --.

<u>Column 16,</u>
Line 53, "fist," should read -- first, --.

UNITED STATES PATENT AND TRADEMARK OFFICE
CERTIFICATE OF CORRECTION

PATENT NO. : 6,674,902 B1
DATED : January 6, 2004
INVENTOR(S) : Kondo et al.

It is certified that error appears in the above-identified patent and that said Letters Patent is hereby corrected as shown below:

<u>Column 19,</u>
Line 38, "above described" should read -- above-described --.

<u>Column 20,</u>
Lines 10 and 34, "above described" should read -- above-described --.

Signed and Sealed this

Twenty-ninth Day of June, 2004

JON W. DUDAS
*Acting Director of the United States Patent and Trademark Office*